US012655072B2

(12) United States Patent
Munion et al.

(10) Patent No.: US 12,655,072 B2
(45) Date of Patent: Jun. 16, 2026

(54) FORMULATION SYSTEM FOR COMPOSITIONS FOR ENHANCING NITROGEN STABILIZERS

(71) Applicants: Verdesian Life Sciences U.S., LLC, Cary, NC (US); Synsus Private Label Partners, LLC., Houston, TX (US)

(72) Inventors: Robert Munion, Corona, CA (US); Kuide Qin, Chapel Hill, NC (US)

(73) Assignees: Verdesian Life Sciences U.S., LLC; Synsus Private Label Partners, LLC.

( * ) Notice: Subject to any disclaimer, the term of this patent is extended or adjusted under 35 U.S.C. 154(b) by 608 days.

(21) Appl. No.: 18/008,537

(22) PCT Filed: Jun. 15, 2021

(86) PCT No.: PCT/US2021/037427
§ 371 (c)(1),
(2) Date: Dec. 6, 2022

(87) PCT Pub. No.: WO2021/257560
PCT Pub. Date: Dec. 23, 2021

(65) Prior Publication Data
US 2023/0339826 A1 Oct. 26, 2023

Related U.S. Application Data

(60) Provisional application No. 63/039,562, filed on Jun. 16, 2020.

(51) Int. Cl.
*C05G 3/90* (2020.01)
*C05C 9/00* (2006.01)
*C05G 5/23* (2020.01)

(52) U.S. Cl.
CPC .................. *C05G 3/90* (2020.02); *C05C 9/00* (2013.01); *C05G 5/23* (2020.02)

(58) Field of Classification Search
CPC ... C05G 3/90; C05G 5/23; C05G 5/20; C05G 5/40; C05C 9/00; C05C 9/005;
(Continued)

(56) References Cited

U.S. PATENT DOCUMENTS 10,435,333 B2 10/2019 Ortiz-Suarez et al.
10,603,858 B2 3/2020 Judd et al.
(Continued)

FOREIGN PATENT DOCUMENTS

EP 4165005 A 8/1979
WO 2016064973 A1 4/2016
(Continued)

OTHER PUBLICATIONS

Styrene Maleic Anhydride, Wikipedia.com (Year: 2025).*
(Continued)

*Primary Examiner* — Amber R Orlando
*Assistant Examiner* — Heather Elise Rainbow
(74) *Attorney, Agent, or Firm* — Katten Muchin Rosenman LLP

(57) ABSTRACT

The presently disclosed subject matter is directed to formulations of nitrogen-stabilizing compositions containing a nitrogen stabilizers component and an organic acid anhydride component along with an aprotic solvent and an amine stabilizer. The formulations disclosed herein exhibit numerous beneficial properties such as increased solubility of the individual components at high concentrations as well as ease increased chemical thermal stability of the formulation.

17 Claims, 4 Drawing Sheets

Treated with Urea and Formulation Untreated Treated with Urea

(58) Field of Classification Search
CPC .......... Y02P 60/21; C08L 35/02; C08L 35/00; C08F 222/06; C05F 3/00
See application file for complete search history.

(56) References Cited

U.S. PATENT DOCUMENTS

| | | | | |
|---|---|---|---|---|
| 10,845,052 | B1 | 11/2020 | Van Otten et al. | |
| 11,781,751 | B2 | 10/2023 | Van Otten et al. | |
| 2016/0332929 | A1* | 11/2016 | McKnight | C05G 5/37 |
| 2017/0050895 | A1* | 2/2017 | Ortiz-Suarez | C05C 9/00 |
| 2018/0044254 | A1 | 2/2018 | Gabrielson et al. | |
| 2018/0162783 | A1 | 6/2018 | Mcknight et al. | |
| 2018/0312447 | A1 | 11/2018 | McKnight et al. | |
| 2019/0048260 | A1 | 2/2019 | Waliwitiya | |

FOREIGN PATENT DOCUMENTS

| | | | | | |
|---|---|---|---|---|---|
| WO | 2016186526 | A1 | | 11/2016 | |
| WO | WO-2017143271 | A1 | * | 8/2017 | C05G 5/37 |
| WO | WO-2017195173 | A1 | * | 11/2017 | C05G 3/90 |

OTHER PUBLICATIONS

International Search Report and Written Opinion mailed Oct. 12, 2021, from PCT/US2021/037427, 8 sheets.
International Preliminary Report on Patentability issued Dec. 13, 2022, from PCT/US2021/037427, 6 sheets.
Cataldo, D.A., et al., "Rapid Colorimetric Determination of Nitrate in Plant Tissue by Nitration of Salicylic Acid", Communications in soil science and plant analysis, 1975 6(1), pp. 71-80.
Kempers, A.J., Zweers, A., "Ammonium determination in soil extracts by the salicylate method", Communications in soil science and plant analysis 1986 v.17 No. 7 pp. 715-723.
Office Action from CN 202180042260.3 with a mailing date of Mar. 29, 2025.
Preliminary Office Action from BR Application No. 112022025527-6, with mailing date of Apr. 9, 2025.

* cited by examiner

Untreated Treated with Urea

Untreated Treated with Urea and Formulation

Treated with Urea and Formulation Untreated Treated with Urea

Treated with Urea and Formulation Untreated

FORMULATION SYSTEM FOR COMPOSITIONS FOR ENHANCING NITROGEN STABILIZERS

CROSS-REFERENCE TO RELATED APPLICATIONS

This application is a U.S. National Stage Entry Application of International Application No. PCT/US2021/037427 filed Jun. 15, 2021, which claims the benefit of U.S. Provisional Patent Application No. 63/039,562 filed Jun. 16, 2020, each of which is herein incorporated by reference in its entirety for all purposes.

FIELD OF THE INVENTION

The presently disclosed subject matter is directed to compositions containing nitrogen stabilizers and organic acid anhydrides and formulations thereof. Further described are uses of these compositions and formulations in agriculture to increase nutrient uptake and inhibit nitrification and/or urease activity.

BACKGROUND

Nitrogen is an essential plant nutrient thought to be important for adequate and strong foliage. Urea provides a large nitrogen content and is the dominant nitrogen fertilizer. In the presence of soil moisture, natural or synthetic ureas are converted to ammonium ion, which is then available for plant uptake. Ammonium can be further converted by bacteria in soil to nitrate through a nitrification process. Nitrate is also available for plant uptake. However, the urea usage efficiency by plants is low.

In practice, nitrogen fertilizer is often just applied once at the beginning of the growing season. Typically, nitrogen fertilizer is formulated as dry granules, prills, or as fluids made up of urea alone or mixed with ammonium nitrate as UAN (a mixture containing urea, ammonium nitrate, and water). Urea is also present in animal manure. These forms of urea have a significant disadvantage in that they undergo rapid decomposition and generate ammonia gas when applied to soil. This is due to the presence of urease enzyme in soils, which reacts with urea to produce ammonium bicarbonate and ammonia. This general set of processes is known in the art as volatilization. Volatilization results in decreased efficiency of nitrogen fertilizer use, lower yields, plant symptoms of nitrogen deficiency, undesirable odors, and potentially harmful ammonia gas concentrations. In addition, the generated ammonia can also be converted to nitrate by bacteria in the soil, which is called nitrification. Excessive nitrate can be converted into nitric oxide or nitrous oxide by certain types of bacteria in the soil, which is called denitrification.

Nitrification and/or urease inhibitors (often referred to as nitrogen stabilizers) have been developed that are capable of delaying degradation of nitrogen fertilizer, thereby reducing losses of nitrogenous degradation products that would otherwise occur in the absence of these inhibitors. The use of nitrification and/or urease inhibitors in combination with nitrogen fertilizers tends to increase the amount of time the nitrogen source remains in the soil and available for absorption by the plants, which then increases the effectiveness of the fertilizer, positively impacting crop yield and quality. However, problems relating to cost, safety, convenience, and stability have limited the use of these types of inhibitors. For example, current products contain expensive organic solvents and have low composition percentages of the inhibitors in the liquid formulations. This necessitates a larger percentage application of these liquid dispersed systems, thus making their use uneconomical and inefficient. Such products include, for example, the NEON™ family of products from Eco Agro Resources, where NBPT and DCD are formulated at low concentrations in organic solvents.

In particular, commercial agricultural products that contain a combination of NBPT and DCD exhibit various drawbacks. Due to their low solubility in aqueous solvents as well as numerous organic solvents providing formulations that contain NBPT and DCD at high concentrations has proven to be challenging and remains an ongoing field of improvement. Current formulations of commercial agricultural products contain large amounts of organic solvents in order to properly formulate NBPT and DCD. Often these formulations employ organic solvent(s) that exhibit undesirable odors (such as dimethyl sulfoxide) and are thus less user friendly and more difficult to handle in the field. In addition, formulations of these products with high amounts of organic solvent have also shown to exhibit a negative impact on the environment and wildlife.

Therefore, finding economical delivery formulations that are safe for the environment and animals and contain the proper balance and concentration of nitrification and urease inhibitor(s) that may be applied directly to liquid fertilizer (such as UAN) would be highly desirable. Thus, despite the continuous ongoing research efforts to improve upon existing products, there still remains a significant need in the art for developing better compositions and formulations that contain nitrogen stabilizers for efficiently controlling enzyme-induced urea decomposition.

SUMMARY OF THE INVENTION

In one aspect, the subject matter described herein is directed to a stabilizing formulation comprising: a nitrogen-stabilizing composition comprising a nitrogen stabilizer component; an organic acid anhydride component, wherein the nitrogen stabilizer component is a urease inhibitor and/or nitrification inhibitor; an aprotic solvent; and an amine stabilizer. In some embodiments, the nitrogen stabilizer component is N-(n-butyl) thiophosphoric triamide (NBPT) and/or dicyanamide (DCD). In some embodiments, the organic acid anhydride component is an organic acid anhydride polymer. In some embodiments, the aprotic solvent is DMSO. In some embodiments, the amine stabilizer is monomethanolamine.

Another aspect is directed to agricultural composition comprising the stabilizing formulation as disclosed herein and a fertilizer.

Another aspect is directed to a method of inhibiting soil-borne urease enzyme comprising the step of applying to the soil a stabilizing formulation as disclosed herein, said formulation being present in a quantity sufficient to inhibit the decomposition of urea by the action of soil-borne urease enzyme.

Another aspect is directed to a method of fertilizing soil comprising the step of applying to the soil a stabilizing formulation as disclosed herein, or an agricultural composition as disclosed herein.

Another aspect is directed a method for preparing a stabilizing formulation as disclosed herein comprising the steps of: mixing an organic acid anhydride component with a first aprotic solvent to form an organic acid anhydride component pre-mix solution; removing an aliquot of the organic acid anhydride component pre-mix solution; diluting the removed aliquot with a second aprotic solvent to render an organic acid anhydride solution; contacting the organic acid anhydride solution with an amine stabilizer to render a stabilizing organic acid anhydride solution; and adding a nitrogen stabilizer component to the stabilized organic acid anhydride solution to yield the desired stabilizing formulation.

These and other aspects will be described in further detail below.

DETAILED DESCRIPTION

Figure 1:
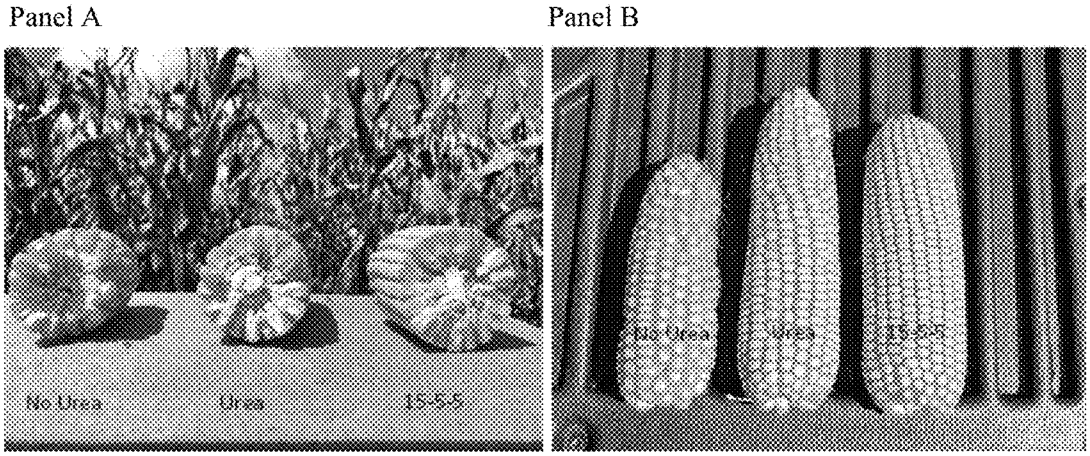
FIG. 1 shows the results of a field study where a corn field was treated with no urea, a urea-containing fertilizer, and a urea-containing fertilizer formulation as disclosed herein (having 15% NBPT, 5% DCD, and 5% organic acid anhydride polymer 6 w/w based on the total weight of the formulation). Panel A in FIG. 1 shows corn cobs that were untreated (left corn cob); treated with nitrogen fertilizer urea (middle corn cob) and a corn cob treated with formulation 15-5-5 as disclosed herein in combination with urea (right corn cob). The number of rows on each corn cob increases from untreated corn cobs>urea treated corn cobs>urea/formulation treated corn cob. Panel B in FIG. 1 shows corn cobs that were untreated (left corn cob), treated with nitrogen fertilizer urea (middle corn cob), and treated with urea in combination with the disclosed formulation 15-5-5 (right corn cob). The number of rows of grain in each corn cob increases with untreated corn cob>urea treated corn cob>urea/formulation treated corn cob.

The presently disclosed subject matter will now be described more fully hereinafter. However, many modifications and other embodiments of the presently disclosed subject matter set forth herein will come to mind to one skilled in the art to which the presently disclosed subject matter pertains, having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

As mentioned above, urea is one of the major nitrogen fertilizers that is widely used in agriculture production. It is believed that up to 40% of the nitrogen applied, as urea can be lost if applied incorrectly, because after it is applied in the field it can react with water through the urease enzyme to form ammonium carbonate. Ammonium carbonate is unstable and breaks down into carbon dioxide and ammonia, which can be volatized and lost to the air. The losses can be substantial and are dependent on a number of factors such as soil pH, soil temperature, soil moisture, cation exchange capacity of the soil, and soil organic matter content.

Many methods for controlling volatile nitrogen losses from urea have been developed or proposed, including the application of metal salts of copper and zinc, boron compounds, organic urease inhibitors, acid coatings, polymer coatings, and reaction of urea with aldehydes to form reaction adducts. For example, N-(butyl) thiophosphoric acid triamide (NBPT) is one of the most known urease inhibitors in agriculture worldwide. Unfortunately, NBPT faces various drawbacks in its use. For example, NBPT is very difficult to handle as it a sticky, waxy, heat and water sensitive material, which cannot be used in its solid form, as it is used at low concentrations making it difficult to evenly distribute on solid urea-containing compositions, e.g. prills (i.e., large granules), and in soil. In order to evenly distribute the NBPT onto the solid urea-containing compositions, the NBPT should be dispersed into a carrier prior to being sprayed onto the solid urea-containing composition. Thus, the use of a solvent system containing the NBPT is desirable as, in its liquid form, the solvent system is capable of distributing the NBPT into granular urea (e.g., urea prills) and into liquid fertilizers containing urea. By introducing the NBPT to liquid fertilizers containing urea (for example, urea-ammonium nitrate solutions or UAN) in a solvent system, the NBPT is more thoroughly dispersed in the liquid fertilizer. In addition, NBPT is thermally unstable and decomposes when in contact with water and acid. This is particularly observed in agricultural fields (e.g., corn fields, wheat fields, etc.) which often reach temperatures in excess of 35° C. and sometimes can reach up to 45° C. or higher. Once decomposed, NBPT is not effective in providing the desired inhibitory effects on the urease enzyme. Thus, formulations that reduce the loss and decomposition rate of NBPT, which in turn can improve its efficacy in the soil, would be of great value in reducing the negative environmental impact of the compound itself.

Dicyandiamide is a nitrification inhibitor that is often used in aqueous agricultural applications, e.g., end use fertilizer compositions. As with urease inhibitors, dicyandiamide has several drawbacks. Nitrification inhibitors, such as dicyandiamide, generally have very low solubility (about 41 grams per liter ("g/l")) in water. Thus, it is difficult to incorporate the nitrification inhibitors into the aqueous end use fertilizer compositions, particularly under field conditions. As a result, nitrification inhibitors such as dicyandiamide are used at low concentrations in water, making it difficult to evenly distribute the nitrification inhibitors on solid urea-containing compositions such as prills (i.e., large granules) and in soil. In order to evenly distribute the dicyandiamide onto urea-containing prills or granules, dicyandiamide should be dispersed into a solvent carrier prior to being sprayed onto the urea. Thus, the use of a solvent system containing dicyandiamide (herein, also termed "DCD") is desirable as, in its liquid form, the solvent system is capable of distributing the dicyandiamide onto urea granules or prills, urea ammonium nitrate granules or prills or, otherwise, urea-containing granules or prills, and into liquid fertilizers containing urea or urea ammonium nitrate. By introducing the dicyandiamide to liquid fertilizers containing urea (for example, urea-ammonium nitrate solutions or UAN) in a solvent system, the DCD is capable of being better dispersed in the liquid fertilizer.

Advantageously, the compositions, formulations and methods described herein have been shown to provide desirable properties for the use of nitrogen stabilizers, such as NBPT and/or DCD, in agriculture by formulating these nitrogen stabilizers with organic acid anhydrides in a particular solvent system as disclosed herein. Combining these nitrogen stabilizers with organic acid anhydrides in the disclosed solvent system (also referred to as the "vehicle") has provided formulations that exhibit various beneficial properties such as, but not limited to, extended thermal/chemical/enzymatic stability, increased shelf life, reduced volatility, reduced application rate, improved viscosity, absence of any strong undesirable odors or smells, ease in preparation, ease of handling, extended/prolonged effect of urease and nitrification inhibition, as well as excellent environmental and toxicology profiles.

Not to be bound by theory, but it is believed that the organic acid anhydride provides a stabilizing effect on the nitrogen stabilizer, which renders improved thermal, chemical, and/or enzymatic stability, thereby reducing the decomposition of the nitrogen stabilizer. Further, the vehicle as disclosed herein allows for solvation of the nitrogen stabilizer and the organic acid anhydride at high concentrations. This provides a formulation that exhibits improved thermal and chemical stability, reduced odor, and additional beneficial properties when compared to currently commercially available formulations nitrogen stabilizers.

Thus, the compositions and formulations disclosed herein not only contribute to an increased availability of the nitrogen stabilizer, but also to extending longevity in their performance as an efficient nitrogen stabilizer.

DEFINITIONS

As used herein, the term "heteroaryl" refers to a radical that comprises at least a five-membered or six-membered unsaturated and conjugated aromatic ring containing at least two ring carbon atoms and one to four ring heteroatoms selected from nitrogen, oxygen, and/or sulfur. Such heteroaryl radicals are often alternatively termed "heteroaromatic" by those of skill in the art. In some embodiments, the heteroaryl radicals have from two to twelve carbon atoms, or alternatively four to five carbon atoms in the heteroaryl ring. Examples include, but are not limited to, pyridinyl, pyrimidinyl, pyrazinyl, pyrrolyl, furanyl, tetrazolyl, isoxazolyl, oxadiazolyl, benzothiophenyl, benzofuranyl, quinolinyl, isoquinolinyl and the like.

As used herein, the term "aryl" refers to a radical comprising at least one unsaturated and conjugated six membered ring analogous to the six membered ring of benzene. Aryl radicals, having such unsaturated and conjugated rings, are also known to those of skill in the art as "aromatic" radicals. In some embodiments, aryl radicals have 6 to 12 ring carbons. Aryl radicals include, but are not limited to, aromatic radicals comprising phenyl and naphthyl ring radicals.

As used herein, the term "substituted" refers to a moiety (such as heteroaryl, aryl, alkyl, and/or alkenyl), wherein the moiety is bonded to one or more additional organic or inorganic substituent radicals. In some embodiments, the substituted moiety comprises 1, 2, 3, 4, or 5 additional substituent groups or radicals. Suitable organic and inorganic substituent radicals include, but are not limited to, hydroxyl, cycloalkyl, aryl, substituted aryl, heteroaryl, heterocyclic ring, substituted heterocyclic ring, amino, mono-substituted amino, di-substituted amino, acyloxy, nitro, cyano, carboxy, carboalkoxy, alkyl carboxamide, substituted alkyl carboxamide, dialkyl carboxamide, substituted dialkyl carboxamide, alkylsulfonyl, alkylsulfinyl, thioalkyl, alkoxy, substituted alkoxy or haloalkoxy radicals, wherein the terms are defined herein. Unless otherwise indicated herein, the organic substituents can comprise from 1 to 4 or from 5 to 8 carbon atoms. When a substituted moiety is bonded thereon with more than one substituent radical, then the substituent radicals may be the same or different.

As used herein, the term "unsubstituted" refers to a moiety (such as heteroaryl, aryl, alkenyl, and/or alkyl) that is not bonded to one or more additional organic or inorganic substituent radical as described above, meaning that such a moiety is only substituted with hydrogens.

As used herein, the term "halo," "halogen," or "halide" refers to a fluoro, chloro, bromo, or iodo atom or ion.

As used herein, the term "alkoxy" refers to an alkyl radical bound through a single, terminal ether linkage; that is, an "alkoxy" group can be defined as OR where R is alkyl as defined above. Examples include, but are not limited to, methoxy, ethoxy, n-propoxy, iso-propoxy, n-butoxy, t-butoxy, iso-butoxy and the like.

As used herein, the term "substituted alkoxy" refers to an alkoxy radical as defined above having one, two, or more additional organic or inorganic substituent radicals bound to the alkyl radical. Suitable organic and inorganic substituent radicals include, but are not limited to, hydroxyl, cycloalkyl, amino, mono-substituted amino, di-substituted amino, acyloxy, nitro, cyano, carboxy, carboalkoxy, alkyl carboxamide, substituted alkyl carboxamide, dialkyl carboxamide, substituted dialkyl carboxamide, alkylsulfonyl, alkylsulfinyl, thioalkyl, thiohaloalkyl, alkoxy, substituted alkoxy, or haloalkoxy. When the alkyl of the alkoxy is bonded thereon with more than one substituent radical, then the substituent radicals may be the same or different.

As used herein, the term "amino" refers to a substituted or unsubstituted trivalent nitrogen-containing radical or group that is structurally related to ammonia ($NH_3$) by the substitution of one or more of the hydrogen atoms of ammonia by a substituent radical.

As used herein, the term "mono-substituted amino" refers to an amino substituted with one radical selected from alkyl, substituted alkyl, or arylalkyl, wherein the terms have the same definitions found herein.

As used herein, the term "di-substituted amino" refers to an amino substituted with two radicals that may be same or different selected from aryl, substituted aryl, alkyl, substituted alkyl or arylalkyl, wherein the terms have the same definitions as disclosed herein. Examples include, but are not limited to, dimethylamino, methylethylamino, diethylamino and the like. The two substituent radicals present may be the same or different.

As used herein, the term "haloalkyl" refers to an alkyl radical, as defined above, substituted with one or more halogens, such as fluorine, chlorine, bromine, or iodine. Examples include, but are not limited to, trifluoromethyl, pentafluoroethyl and the like.

As used herein, the term "haloalkoxy" refers to a haloalkyl, as defined above, which is directly bonded to oxygen to form trifluoromethoxy, pentafluoroethoxy and the like.

As used herein, the term "acyl" denotes a radical containing a carbonyl (—C(O)—R group) wherein the R group is hydrogen or has 1 to 8 carbons. Examples include, but are not limited to, formyl, acetyl, propionyl, butanoyl, iso-butanoyl, pentanoyl, hexanoyl, heptanoyl, benzoyl and the like.

As used herein, the term "acyloxy" refers to a radical containing a carboxyl (—O—C(O)—R) group wherein the R group comprises hydrogen or 1 to 8 carbons. Examples include, but are not limited to, acetyloxy, propionyloxy, butanoyloxy, iso-butanoyloxy, benzoyloxy and the like.

As used herein, the term "alkyl group" refers a saturated hydrocarbon radical containing 1 to 8, 1 to 6, 1 to 4, or 5 to 8 carbons. In some instances, the alkyl group refers to a saturated hydrocarbon radical containing more than 8 carbons. An alkyl group is structurally similar to a noncyclic alkane compound modified by the removal of one hydrogen from the noncyclic alkane, and the substitution therefore of a non-hydrogen group or radical. Alkyl group radicals can be branched or unbranched. Lower alkyl group radicals have 1 to 4 carbon atoms. Higher alkyl group radicals have 5 to 8 carbon atoms. Examples of alkyl, lower alkyl, and higher alkyl group radicals include, but are not limited to, methyl, ethyl, n-propyl, isopropyl, n-butyl, sec-butyl, t-butyl, amyl, t-amyl, n-pentyl, n-hexyl, i-octyl and like radicals.

As used herein, the term "alkenyl group" refers an unsaturated hydrocarbon radical containing 2 to 8, 2 to 6, 2 to 4, or 5 to 8 carbons and at least one carbon-carbon double bond. In some instances, the alkenyl group refers to an unsaturated hydrocarbon radical that contains more than 8 carbons. The unsaturated hydrocarbon radical is similar to an alkyl radical, as defined above, which also comprises at least one carbon-carbon double bond. Examples include, but are not limited to, vinyl, allyl, 2-butenyl, 3-butenyl, 2-pentenyl, 3-pentenyl, 4-pentenyl, 2-hexenyl, 3-hexenyl, 4-hexenyl, 5-hexanyl, 2-heptenyl, 3-heptenyl, 4-heptenyl, 5-heptenyl, 6-heptenyl and the like. The term "alkenyl" includes dienes and trienes of straight and branch chains.

As used herein, the term "monocyclic" refers to a molecular structure that contains a single ring of atoms such as, for example, benzene or cyclopropane.

As used herein, the term "bicyclic" refers to a molecular structure that contains two rings of atoms that are fused together such as, for example, naphthalene.

As used herein, the term "tricyclic" refers to a molecular structure that contains three rings of atoms that are fused together.

As used herein, "nitrogen stabilizers" refers to any substance or mixture of substances intended for preventing or hindering the process of nitrification, denitrification, ammonia volatilization, or urease production through action upon soil bacteria.

As used herein, "nitrification inhibitor" refers to a property of a compound to inhibit oxidation of ammonia to nitrite/nitrate.

As used herein, the term "urease inhibitor" refers to a property of a compound to inhibit the activity of urease enzymes. The inhibition can be quantified as described elsewhere herein.

As used herein, the term "thermal stability" refers to the stability of a substance when exposed to a thermal stimulus over a given period of time. Examples of thermal stimuli include, but are not limited to, heat generated from an electrical source and/or heat generated from the sun.

As used herein, the term "chemical stability" refers to the resistance of a substance to structurally change when exposed to an external action such as air (which can lead to oxidation), light (e.g., sun light), moisture/humidity (from water), heat (from the sun), and/or chemical agents. Exemplary chemical agents include, but are not limited to, any organic or inorganic substance that can degrade the structural integrity of the compound of interest (e.g., the disclosed polyanionic polymer).

As used herein, the term "enzymatic stability" refers to the resistance of a substance to external biological organisms to break down the structural stability of a substance (e.g., disclosed anionic polymer). Exemplary biological organisms include, but are not limited to, bacteria and microorganisms present in the soil.

As used herein, the term "effective amount" refers to an amount of a nitrogen-stabilizing composition and/or the amount of each component in the stabilizing composition (i.e., nitrogen stabilizer component and/or cyclic organic acid anhydride component), which is sufficient for achieving nitrification inhibition and/or urease inhibition as described below. More exemplary information about amounts, ways of application, and suitable ratios to be used is given below. A skilled artisan is well aware of the fact that such an amount can vary in a broad range, and is dependent on various factors, e.g., weather, target species, locus, mode of application, soil type, treated cultivated plant or material, and the climatic conditions.

As used herein, the term "soil" is to be understood as a natural body comprised of living (e.g., microorganisms (such as bacteria and fungi), animals, and plants) and nonliving matter (e.g., minerals and organic matter (e.g., organic compounds in varying degrees of decomposition), liquid, and gases) that occurs on the land surface, and is characterized by soil horizons that are distinguishable from the initial material as a result of various physical, chemical, biological, and anthropogenic processes. From an agricultural point of view, soils are predominantly regarded as the anchor and primary nutrient base for plants (plant habitat).

As used herein, the term "fertilizer" is to be understood as chemical compounds applied to promote plant and fruit growth. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Organic fertilizers include manure, slurry, worm castings, peat, seaweed, sewage, and guano. Green manure crops are also regularly grown to add nutrients (especially nitrogen) to the soil. Manufactured organic fertilizers include compost, blood meal, bone meal, and seaweed extracts. Further examples are enzymatically digested proteins, fish meal, and feather meal. The decomposing crop residue from prior years is another source of fertility. In addition, naturally occurring minerals such as mine rock phosphate, sulfate of potash, and limestone are also considered inorganic fertilizers. Inorganic fertilizers are usually manufactured through chemical processes (such as the Haber-Bosch process), also using naturally occurring deposits, while chemically altering them (e.g., concentrated triple superphosphate). Naturally occurring inorganic fertilizers include Chilean sodium nitrate, mine rock phosphate, and limestone.

As used herein, the term "manure" is to be understood as organic matter used as organic fertilizer in agriculture. Depending on its structure, manure can be divided into liquid manure, semi-liquid manure, stable or solid manure, and straw manure. Depending on its origin, manure can be divided into manure derived from animals or plants. Common forms of animal manure include feces, urine, farm slurry (liquid manure), or farmyard manure (FYM), whereas FYM also contains a certain amount of plant material (typically straw), which may have been used as bedding for animals. Animals from which manure can be used comprise horses, cattle, pigs, sheep, chickens, turkeys, rabbits, and guano from seabirds and bats. The application rates of animal manure when used as fertilizer highly depends on the origin (type of animals). Plant manures may derive from any kind of plant, whereas the plant may also be grown explicitly for the purpose of plowing them in (e.g., leguminous plants), thus improving the structure and fertility of the soil. Furthermore, plant matter used as manure may include the contents of the rumens of slaughtered ruminants, spent hops (left over from brewing beer), or seaweed.

As used herein, the term "seed" comprises seeds of all types, such as, for example, corns, seeds, fruits, tubers, seedlings, and similar forms. The seed used can be the seed of the useful plants mentioned above, but also the seed of transgenic plants or plants obtained by customary breeding methods.

Throughout this specification and the claims, the words "comprise," "comprises," and "comprising" are used in a nonexclusive sense, except where the context requires otherwise, and are synonymous with "including," "containing," or "characterized by," meaning that it is open-ended and does not exclude additional, unrecited elements or method steps.

As used herein, the transitional phrase "consisting essentially of" limits the scope of a claim to the specified materials or steps "and those that do not materially affect the basic and novel characteristic(s)" of the claimed presently disclosed subject matter.

As used therein, the transitional phrase "consisting of" excludes any element, step, or ingredient not specified in the claim.

As used herein, the term "about," when referring to a value is meant to encompass variations of, in some embodiments ±5%, in some embodiments ±2%, in some embodiments ±1%, in some embodiments ±0.5%, and in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller ranges is also encompassed, subject to any specifically excluded limit in the stated range. Where the stated range includes one or both of the limits, ranges excluding either or both of those included limits are also included.

Additional definitions may follow below.

I. Composition

The presently disclosed subject matter relates to nitrogen-stabilizing compositions comprising/consisting essentially of a nitrogen stabilizer component and an organic acid anhydride component. These nitrogen-stabilizing compositions exhibit many beneficial properties such as, but not limited to, thermal/chemical/enzymatic stability, increased shelf life, reduced volatility, reduced application rate, ease in preparation, ease of handling, extended/prolonged effect of urease and nitrification inhibition, as well as excellent environmental and toxicology profiles.

The relative amount of each component (i.e., the nitrogen stabilizer component and the organic acid anhydride component) present in the nitrogen-stabilizing composition can vary. For example, in some embodiments, the nitrogen stabilizer component and the organic acid anhydride component are present in the nitrogen-stabilizing composition in amounts ranging from about 1:1,000 to about 1,000:1; from about 1:100 to about 100:1, from about 1:50 to about 50:1, from about 1:25 to about 25:1, from about 1:10 to about 10:1, from about 1:5 to about 5:1, or from about 1:2 to 2:1, or about 1:1 molar ratio of nitrogen stabilizer component to organic acid anhydride component. In some embodiments, the amount of nitrogen stabilizer component present in the nitrogen-stabilizing composition ranges from about 1% to about 99%, from about 1% to about 90%, from about 1% to about 80%, from about 1% to about 70%, or from about 1% to about 60%, from about 1% to about 50%, from about 1% to about 40%, from about 1% to about 30% from about 1% to about 20%, or from about 1% to about 10% by weight (or no more than about 50%, about 45%, about 40%, about 35%, about 30%, about 25%, about 20%, about 15%, or no more than about 10% by weight) based on the total weight of the nitrogen stabilizer composition.

In some embodiments, the amount of organic acid anhydride component present in the nitrogen-stabilizing composition ranges from about 1% to about 99%, from about 1% to about 90%, from about 1% to about 80%, from about 1% to about 70%, or from about 1% to about 60%, from about 1% to about 50%, from about 1% to about 40%, from about 1% to about 30% from about 1% to about 20%, or from about 1% to about 10% by weight (or no more than about 50%, about 45%, about 40%, about 35%, about 30%, about 25%, about 20%, about 15%, or no more than about 10% by weight) based on the total weight of the nitrogen stabilizer composition.

In some embodiments, the nitrogen-stabilizing composition further comprises one or more nitrification inhibitor(s) and/or one or more urease inhibitor(s). Such additional nitrification and/or urease inhibitors can be the same as or different than the nitrification inhibitor(s) and/or urease inhibitor(s) present in the nitrogen stabilizer component.

The nitrogen stabilizer component and organic acid anhydride component are discussed in more detail below.

A.1. Nitrogen Stabilizer Component

Generally, the disclosed nitrogen stabilizer component can be a urease inhibitor and/or a nitrification inhibitor. In some embodiments, the urease inhibitor and/or nitrification inhibitor comprises at least one amine-containing moiety. In some embodiments, such amine-containing moieties contain a primary amine (i.e., $-NH_2$) and/or a secondary amine (i.e., —NHR; wherein R can be a substituted or unsubstituted alkyl group).

In some embodiments, the nitrogen stabilizer component is a urease inhibitor. Exemplary urease inhibitors include, but are not limited to, thiophosphoric-based urease inhibitors such as, but not limited to, N-alkyl-thiophosphoric triamides (e.g., N-(n-butyl) thiophosphoric triamide (NBPT) and N-(n-propyl) thiophosphoric triamide), N-cycloalkyl-thiophosphoric triamides, N-aryl-thiophosphoric triamides (e.g. N-(2-nitrophenyl) phosphoric acid triamide), and any derivative thereof. In some embodiments, the urease inhibitor is NBPT.

In some embodiments, the nitrogen stabilizer component is a combination of urease inhibitors. In some embodiments, the one or more urease inhibitors are selected from thiourea-based urease inhibitors, urea-based urease inhibitors, phosphor(di)amide-based urease inhibitors, substituted semicabazones (e.g., (2E)-2-[(3-fluorophenyl)methylidene] hydrazine-1-carboxamide and (2E)-2-[(4-nitrophenyl)methylidene]hydrazine-1-carboxamide), polyphenols (e.g., methyl gallate, baicalin, scutellarin, 1,2,3,4,6-penta-O-galloyl-D-glucoside, caffeic acid, and tannic acid), hydroxyaldehydes (like salicylaldehyde and vanillin), amino aromatics (like methoxy aniline) and a combination thereof.

In some embodiments, the nitrogen stabilizer component is a nitrification inhibitor. Exemplary nitrification inhibitors include, but are not limited to, dicyandiamide (DCD) and any derivative thereof. In some embodiments, the nitrification inhibitor is DCD. In some embodiments, the nitrogen stabilizer component is a combination of nitrification inhibitors. In some embodiments, the one or more nitrification inhibitors are selected from pyrazoles (e.g., 3,4-dimethylpyrazole and 4-chloro-3-methylpyrazole), propargylamine, substituted alkynes (e.g. 2-methyl-3-butyn-2-ol, 3,5-dimethyl-1-hexyn-3-ol) substituted thioureas (e.g. N-allylthiourea and 1-amidino-2-thiourea), and a combination thereof.

In some embodiments, the nitrogen stabilizer component is a urease inhibitor and a nitrification inhibitor. For example, in some embodiments, the urease inhibitor is NBPT and the nitrification inhibitor is DCD. The relative amounts of the urease inhibitor and the nitrification inhibitor present in the nitrogen stabilizer component can vary. For example, in some embodiments, the amount of the urease inhibitor ranges from about 1 to about 99% by weight and the amount of the nitrification inhibitor ranges from about 99 to about 1% by weight based on the total weight of the nitrogen stabilizer component. In some embodiments, the amount of the urease inhibitor ranges from about 10 to about 90%, from about 20 to about 80%, from about 30 to about 70%, or 40 to about 60% by weight and the amount of the nitrification inhibitor ranges from about 90 to about 10%, from about 80% to about 20%, from about 70 to about 30%, from about 60 to about 40% by weight, respectively, based on the total weight of the nitrogen stabilizer component. In some embodiments, the amount of urease inhibitor is less than about 90%, less than about 80%, less than about 70%, less than about 60%, less than about 50%, less than about 40%, less than about 30%, less than about 20%, or less than about 10% by weight based on the total weight of the nitrogen-stabilizing composition. In some embodiments, the amount of nitrification inhibitor is less than about 90%, less than about 80%, less than about 70%, less than about 60%, less than about 50%, less than about 40%, less than about 30%, less than about 20%, or less than about 10% by weight based on the total weight of the nitrogen-stabilizing composition. In some embodiments, the urease inhibitor and nitrification inhibitor are present in the nitrogen-stabilizing composition in amounts ranging from about 1:100 to about 100:1; from about 1:75 to about 75:1, from about 1:50 to about 50:1, from about 1:25 to about 25:1, from about 1:10 to about 10:1, from about 1:5 to about 5:1, or from about 1:2 to 2:1, or about 1:1 molar ratio of urease inhibitor to nitrification inhibitor.

A.2. Organic Acid Anhydride Component

The disclosed organic acid anhydride component is selected from a linear organic acid anhydride monomer, a cyclic organic acid anhydride monomer, a linear organic acid anhydride polymer, a cyclic organic acid anhydride polymer, and combinations thereof, wherein each one of them is described in more detail below.

A.2.1. Linear and Cyclic Organic Acid Anhydride Monomers

The linear organic acid anhydride monomer disclosed herein has the formula as shown below:

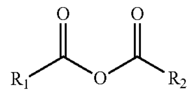

(formula I)

wherein $R_1$ and $R_2$ are independently selected from a substituted or unsubstituted C1-C8 alkyl group, a substituted or unsubstituted C2-C8 alkenyl group, a substituted or unsubstituted C3-C8 cycloalkyl group, a substituted or unsubstituted aryl group, and a substituted or unsubstituted heteroaryl group.

In some embodiments, the linear organic acid anhydride monomer is saturated. In some embodiments, the linear organic acid anhydride is unsaturated. In some embodiments, the linear organic acid anhydride monomer contains 1, 2, 3, 4, 5, or 6 double bonds.

In some embodiments, the organic acid anhydride monomer is a cyclic organic acid anhydride monomer. In some embodiments, the cyclic organic acid anhydride component is monocyclic. In some embodiments, the cyclic organic acid anhydride is bi- or tricyclic.

In some embodiments, the cyclic organic acid anhydride monomer is monocyclic as shown in formula II below:

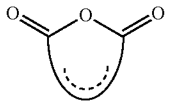

(formula II)

wherein ----- indicates any bonds in the above acid anhydride-containing ring structure that can be unsaturated (e.g., represents a double bond).

In some embodiments, the cyclic organic acid anhydride monomer is saturated. In some embodiments, the cyclic organic acid anhydride is unsaturated. In some embodiments, the cyclic organic acid anhydride monomer contains one double bond. In some embodiments, the cyclic organic acid anhydride monomer contains more than one double bond (e.g., 2, 3, 4 or 5 double bonds). Exemplary cyclic organic acid anhydride containing one or more double bonds include, but are not limited to, glutaconic anhydride, 3,6-dihydro-2,7-oxepindione, 2,7-oxepindione, 4,7-dihydro-2H-oxocin-2,8(3H)-dione, and/or 3,4,7,8-tetrahydro-2,9-oxonidione.

The ring size of the cyclic organic acid anhydride monomer can vary. For example, in some embodiments, the cyclic organic acid anhydride monomer is selected from a five-membered, six-membered, seven-membered, eight-membered, nine-membered, ten-membered, eleven-membered, or twelve-membered cyclic organic acid anhydride monomer or a combination thereof. Exemplary cyclic organic acid anhydride monomers include, but are not limited to, glutaric anhydride, adipic anhydride, 2,8-oxocanedione, 2,9-oxonanedione, 2,10-oxecanedione, sebacic anhydride, and/or oxacyclododecane-2,12-dione.

In some embodiments, the cyclic organic acid anhydride monomer is a five-membered cyclic organic acid anhydride monomer. In some embodiments, the cyclic organic acid anhydride monomer is maleic anhydride. In some embodiments, the cyclic organic acid anhydride monomer is succinic anhydride.

In some embodiments, the cyclic organic acid anhydride monomer is substituted with one or more substituents. In some embodiments, the organic acid anhydride is bi- or tricyclic. Exemplary bi- or tricyclic organic acid anhydride monomers include, but are not limited to, hexahydrophthalic anhydride, methyl hexahydrophthalic anhydride, methyl tetrahydophthalic anhydride, tetrahydrophthalic anhydride, himic anhydride, chlorendic anhydride, phthalic anhydride, trimellitic anhydride, tetrachlorophthalic anhydride, pyromellitic dianhydride, tetrabromophthalic anhydride, succinic anhydride, citraconic anhydride, maleic anhydride, or combinations thereof.

A.2.2. Organic Acid Anhydride Polymers

As mentioned above, the organic acid anhydride component can also comprise an organic acid anhydride polymer. In some embodiments, the organic acid anhydride polymer is a copolymer of two different repeat units. In some embodiments, the organic acid anhydride polymer is a copolymer of more than two different repeat units. In some embodiments, at least one of the two different repeat units contains an anhydride moiety. In some embodiments, the organic acid anhydride polymer can be, but is not limited to, a random copolymer, an alternating copolymer, a periodic copolymer, a statistical copolymer, or a block copolymer. In some embodiments, the organic acid anhydride polymer is a random copolymer.

In some embodiments, the organic acid anhydride polymer has a high content of anhydride moieties, which makes them very soluble in water and biodegradable. In some embodiments, the organic acid anhydride polymer has a content of anhydride moieties of at least 75, 80, 85, 90, 95 or 98 mole %. In some embodiments, the organic acid anhydride polymer has a content of anhydride moieties ranging from about 50% to about 99%, from about 60% to about 98%, from about 70% to about 95%, or from about 80% to about 90 mole %.

The repeat units are derived from corresponding monomers used in the synthesis of the organic acid anhydride polymers. In some embodiments, the organic acid anhydride polymer contains type B and type C repeat units. These repeat units and their corresponding monomers are discussed in more detail below.

A.3.1. Type B Repeat Units

Type B repeat units can be selected from repeat units derived from substituted or unsubstituted monomers of linear and/or cyclic organic acid anhydrides as, discussed above, containing a double bond. In some embodiments, the linear organic acid anhydrides can be derived from monomers of linear organic acid anhydrides according to the formula III shown below:

(formula III)

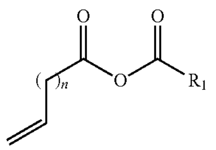

wherein $R_1$ is selected from a substituted or unsubstituted C1-C8 alkyl group, a substituted or unsubstituted C2-C8 alkenyl group, a substituted or unsubstituted C3-C8 cycloalkyl group, a substituted or unsubstituted aryl group, and a substituted or unsubstituted heteroaryl group; and n is an integer selected from 0, 1, 2, 3, 4, 5, 6, 7, 8, 9, or 10.

In some embodiments, the cyclic organic acid anhydrides can be derived from monomers of cyclic organic acid anhydrides according to the formula IV shown below:

(formula IV)

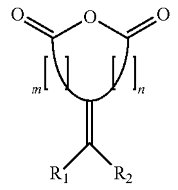

wherein $R_1$ and $R_2$ are independently selected from —H, —OH, —COOH, —COOR, —OCOH, OCOR, —OR, —CN, —$SO_2$R, —$SO_3$R, —COR, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted alkyl group;

n on the above ring portion shows the number of carbon atoms as an integer selected from 1, 2, 3, 4, 5, 6, 7, 8, 9, or 10; and m on the above ring portion shows the number of carbons as an integer selected from 1, 2, 3, 4, 5, 6, 7, 8, 9, or 10.

The ring size of the cyclic organic acid anhydride moiety in the above formula IV can vary. For example, in some embodiments, the cyclic organic acid anhydride moiety is selected from a five-membered, six-membered, seven-membered, eight-membered, nine-membered, ten-membered, eleven-membered, or twelve-membered cyclic organic acid anhydride monomer, or a combination thereof. In some embodiments, the cyclic organic acid anhydride monomer is a five-membered cyclic organic acid anhydride moiety.

In some embodiments, the type B repeat unit is derived from maleic anhydride. In some embodiments, the type B repeat unit is derived from itaconic anhydride.

In some embodiments, the unsubstituted or substituted alkyl group is a $C_1$-$C_8$ alkyl group.

A.3.2. Type C Repeat Units

Type C repeat units can be selected from repeat units derived from substituted or unsubstituted monomers of alkenes according to formula V:

(formula V)

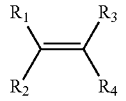

wherein $R_1$, $R_2$, $R_3$, and $R_4$ are independently selected from —H, —COOH, —COOR, —OCOH, —OCOR, —OR, —CN, —$SO_2R$, —$SO_3R$, —COR, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted alkyl group.

Examples of classes of monomers that may be used are alkenes such as ethylene, propylene, butene-1 (butylene), iso-butylene, pentene-1, hexene-1, heptene-1, octene-1,2,4, 4-trimethyl pentene-1, trimethyl ethylene, trans-stilbene and methylene cyclohexane; cycloalkenes such as cyclopentene and cyclohexene; aralkenes such as styrene, trimethylstyrene, a-ethyl styrene and other substituted derivatives of styrene; vinyl ethers such as methyl vinyl ether, ethyl vinyl ether, propyl vinyl ether, isopropyl vinyl ether and isobutyl vinyl ether; isopropenyl ethers such as methyl isopropenyl ether; ethylenically unsaturated carboxylic acids, their esters and nitriles such as methyl acrylate, ethyl acrylate, 2-ethyl hexyl acrylate, acrylonitrile, methyl methacrylate and methacrylonitrile; ethylenically unsaturated dicarboxylic acids, their mono- and diesters, nitriles, anhydrides, and imides such as dimethyl maleate, diethyl maleate, dibutyl maleate, maleic anhydride, maleimide, N-methyl maleimide, N-ethyl maleimide, N-phenyl maleimide, N-p-chlorophenyl maleimide, dimethyl fumarate, diethyl fumarate, dibutyl fumarate, itaconic anhydride, monobutyl itaconate, citraconic anhydride, mesaconic anhydride and vinylidene cyanide; and halogen-substituted alkenes such as vinyl chloride, vinylidene chloride, allyl chloride and methallyl chloride.

In some embodiments, the type C repeat unit is derived from ethylene, propylene, butylene, isobutylene, styrene, methyl vinyl ether or a combination thereof.

In some embodiments, the substituted or unsubstituted alkyl group is a substituted or unsubstituted $C_1$-$C_8$ alkyl group.

Broadly speaking, the organic acid anhydride polymers disclosed herein include recurring polymeric subunits made up of two different moieties individually and respectively taken from the group consisting of what have been denominated for ease of reference as B and C moieties; alternately, the cyclic organic acid anhydride polymers may be formed from recurring B moieties. Thus, exemplary polymeric subunits may be BC, CB, BB, or any other combination of B and C moieties; moreover, in a given cyclic organic acid anhydride polymer, different polymeric subunits may include different types of moieties, e.g., in a BC recurring polymeric unit polymer, the B moiety may be different in different units.

In detail, moiety B is of the general formula VI:

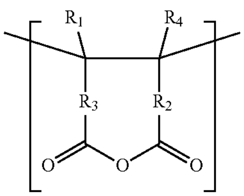

or

-continued

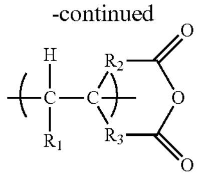

wherein $R_1$ and $R_4$ are independently selected from —H, —OH, —COOH, —COOR, —OCOH, —OCOR, —OR, —CN, —$SO_2R$, —$SO_3R$, —COR, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted $C_1$-$C_8$ alkyl group, a substituted or unsubstituted $C_2$-$C_8$ alkenyl group, a substituted or unsubstituted aryl group, a substituted or unsubstituted heteroaryl group; and $R_2$ and $R_3$ are independently selected from a bond or substituted or unsubstituted $C_1$-$C_8$.

Moiety C is of the general formula VII:

(formula VII)

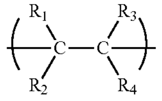

which can be further divided into the following three sub-formulae:

(VIIa)

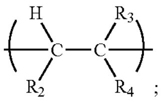

;

(VIIb)

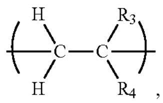

, and (VIIc)

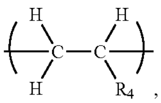

, wherein $R_1$ $R_2$, $R_3$ and $R_4$ are independently selected from —H, —COOH, —COOR, —OCOH, —OCOR, —OR, —CN, —$SO_2R$, —$SO_3R$, —COR, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted $C_1$-$C_8$ alkyl group, a substituted or unsubstituted $C_2$-$C_8$ alkenyl group, a substituted or unsubstituted aryl group, a substituted or unsubstituted heteroaryl group.

As can be appreciated, the disclosed organic acid anhydride polymers can have different sequences of recurring polymeric subunits as defined above (for example, a polymer comprising B and C subunits may include all two forms of B subunit and all four forms of C subunit). However, for reasons of cost and ease of synthesis, the most useful polymers include recurring polymeric subunits made up of B and C moieties.

In some embodiments, the organic acid anhydride polymers are composed of recurring polymeric subunits formed of B and C moieties and have the generalized formula VIII:

(formula VIII)

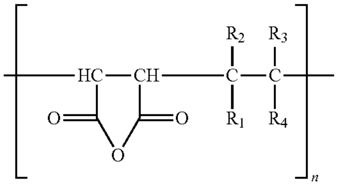

wherein $R_1$ $R_2$, $R_3$ and $R_4$ are independently selected from —H, —COOH, —COOR, —OCOH, —OCOR, —OR, —CN, —$SO_2R$, —$SO_3R$, —COR, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted $C_2$-$C_8$ alkenyl group, a substituted or unsubstituted aryl group, a substituted or unsubstituted heteroaryl group; and n is an integer greater than 2.

In some embodiments, other forms of this polymer are capable of having a wide range of repeat unit concentrations in the polymer. For example, polymers having varying ratios of B:C (e.g., 10:90, 60:40, 50:50 and even 0:100) are contemplated and embraced by the present presently disclosed subject matter. Such polymers would be produced by varying monomer amounts in the reaction mixture from which the final product is eventually produced, and the type B and C repeating units may be arranged in the polymer backbone in random order or in an alternating pattern.

In some embodiments, at least about 80 mole %, about 85%, about 90%, or about 95% of the repeat units therein are type B repeat units. In some embodiments, these repeat units are randomly located along the polymer.

The polymers of the presently disclosed subject matter may have a wide variety of molecular weights, ranging, for example, from about 500-5,000,000 Da, from about 1,000-500,000 Da or from about 10,000 to about 50,000 Da depending chiefly upon the desired end use. Additionally, n can range from about 1-10,000 and more preferably from about 1-5,000.

In general, the above polymers can be made by free radical polymerization, thus converting selected monomers into polymers with repeat units. Such polymers may be further modified to impart particular structures and/or properties. A variety of techniques can be used for generating free radicals, such as addition of peroxides, hydroperoxides, azo initiators, persulfates, percarbonates, per-acid, charge transfer complexes, irradiation (e.g., UV, electron beam, X-ray, gamma radiation and other ionizing radiation types), and combinations of these techniques. An extensive variety of methods and techniques are well known in the art of polymer chemistry for initiating free-radical polymerizations.

The polymerization reactions are carried out in a compatible solvent system, namely a system which does not unduly interfere with the desired polymerization, using desired monomer concentrations. A number of suitable aqueous or nonaqueous solvent systems can be employed, such as ketones, alcohols, esters, ethers, aromatic solvents, water and mixtures thereof. Water alone and the lower ($C_1$-$C_4$) ketones and alcohols are especially preferred, and these may be mixed with water if desired. In some instances, the polymerization reactions are carried out with the substantial exclusion of oxygen, and most usually under an inert gas such as nitrogen or argon. There is no particular criticality in the type of equipment used in the synthesis of the polymers, e.g., stirred tank reactors, continuous stirred tank reactors, plug flow reactors, tube reactors and any combination of the foregoing arranged in series may be employed. A wide range of suitable reaction arrangements are well known to the art of polymerization.

In general, the initial polymerization step is carried out at a temperature of from about 0° C. to about 120° C. (or from about 30° C. to about 95° C. for a period of from about 0.25 hours to about 24 hours; or from about 0.25 hours to about 5 hours). Usually, the reaction is carried out with continuous stirring and upon completion of the polymerization reaction, the polymer can be isolated.

B. Preparative Methods

Methods for preparing a nitrogen-stabilizing composition as disclosed herein generally comprises contacting a nitrogen stabilizer component with a cyclic organic acid anhydride component. The term "contacting", in this context, refers to the nitrogen stabilizer being exposed to, touched with, and/or physically mixed with the cyclic organic acid anhydride component. Contacting of the two components typically occurs when both components are present in the same space (e.g., a reaction vessel and/or container) without being physically separated.

The amount of nitrogen stabilizer and cyclic organic acid anhydride component can vary. In some embodiments, the amount of nitrogen stabilizer and cyclic organic acid anhydride component present in a molar ratio ranging from about 1:10 to about 10:1, from about 1:8 to about 8:1, from about 1:5 to about 5:1, from about 1:3 to about 3:1, from about 1:2 to about 2:1, or about 1:1 nitrogen stabilizer to cyclic organic acid anhydride in in the contacting step of the method described above.

In some embodiments, the contacting step in the method described above can be carried out solvent free. In some embodiments, the contacting step can be carried out in a solvent. Exemplary solvents include, but are not limited to, alcohols (e.g., methanol, ethanol, isopropanol), ethers (e.g., diethyl ether, tetrahydrofuran), halogenated solvents (e.g., dichloromethane), esters (e.g., ethyl acetate), aromatics (e.g., benzene, toluene), non-polar solvents (e.g., acetonitrile, dimethyl sulfoxide) and the like.

In some embodiments, the above contacting step can be carried out at room temperature (e.g., about 25° C.). In some embodiments, the above contacting step can be carried out at elevated temperatures (e.g., at least 30, 35, 40, 45, 50, 55, 60, 65, 70, 75, 80, 85, 90 95 or at least 100° C.). In some embodiments, the above contacting step can be carried at temperatures below room temperature (e.g., below 20, 10, 5, 0, −5, −10, −15, −20 or below −30° C.). In some embodiments, the above contacting step can be carried out at a temperature ranging from about 30° C. to about 100° C., from about 40° C. to about 80° C., from about 45° C. to about 75° C., or from about 50° C. to about 70° C. In some embodiments, the above contacting step can be carried at temperatures below room temperature (e.g., below about 20, 10, 5, 0, −5, −10, −15, −20 or below about −30° C.). In some embodiments, the above contacting step can be carried out at temperatures ranging from about −30° C. to about 10° C., from about −25° C. to about 5° C., from about −15° C. to about 0° C., or from about −10° C. to about −5° C.

Once the contacting step is complete any residual liquid (e.g., solvent and/or excess nitrogen stabilizer/cyclic organic acid anhydride component) can be removed according to known methods in the art and the remaining crude material can be purified using known purification methods in the art if needed (e.g., high pressure liquid chromatography (HPLC) purification, gas chromatography (GC), distillation, crystallization, chromatographic purification methods (i.e., silica, alumina), and the like).

C. Nitrogen-Stabilizing Composition

As mentioned above, the nitrogen-stabilizing composition can exhibit desirable properties such as increased thermal/chemical/enzymatic stability, increased shelf life, reduced volatility, reduced application rate, improved viscosity, ease in preparation, ease of handling, extended/prolonged effect of urease and nitrification inhibition, as well as excellent environmental and toxicology profiles, all of which generally contribute to an increased performance in the field.

In some embodiments, the nitrogen-stabilizing composition further comprises a second nitrification inhibitor and/or urease inhibitor. The amount of the second nitrification inhibitor and/or urease inhibitor can vary. In some embodiments, the amount of the second nitrification inhibitor and/or urease inhibitor ranges from about 1% to about 99%, from about 5% to about 90%, from about 10% to about 80%, from about 10% to about 70%, from about 20% to about 60% or from about 30% to about 50% by weight, based on the total weight of the nitrogen-stabilizing composition. In some embodiments, the second nitrification inhibitor and/or urease inhibitor is the same as the nitrification inhibitor and/or urease inhibitor present in the nitrogen stabilizer component. In some embodiments, the second nitrification inhibitor and/or urease inhibitor is different compared to the nitrification inhibitor and/or urease inhibitor present in the nitrogen stabilizer component. In some embodiments, the second nitrification inhibitor is nitrapyrin.

In some embodiments, the amount of the nitrogen stabilizer component and second nitrification inhibitor and/or urease inhibitor present in the nitrogen-stabilizing composition can range in a weight ratio from about 1:100 to about 100:1, from about 1:80 to about 80:1, from about 1:50 to about 50:1, from about 1:30 to about 30:1, from about 1:20 to about 20:1, from about 1:10 to about 10:1, from about 1:8 to about 8:1, from about 1:5 to about 5:1, from about 1:3 to about 3:1, from about 1:2 to about 2:1, or about 1:1 nitrogen stabilizer component to second nitrification inhibitor and/or urease inhibitor.

In some embodiments, the nitrogen-stabilizing composition disclosed herein is chemically/thermally/and/or enzymatically more stable compared to compositions containing a nitrogen stabilizer with no organic acid anhydride present. In some embodiments, the nitrogen-stabilizing composition is at least 10%, 20%, 30%, 40%, 50%, 60%, 70%, 80%, 90%, or at least 95% more chemically stable compared to a composition containing a nitrogen stabilizer with no organic acid anhydride component. In some embodiments, the nitrogen-stabilizing composition is at least 10%, 20%, 30%, 40%, 50%, 60%, 70%, 80%, 90%, or at least 95% more thermally stable compared to a composition containing a nitrogen stabilizer with no organic acid anhydride component. In some embodiments, the nitrogen-stabilizing composition is at least 10%, 20%, 30%, 40%, 50%, 60%, 70%, 80%, 90%, or at least 95% more enzymatically stable compared to a composition containing a nitrogen stabilizer with no organic acid anhydride component. The thermal/chemical/enzymatic stability of the disclosed compositions is measured as a function of the amount of nitrogen stabilizer being present after a certain amount of time when exposed to chemical/thermal/enzymatic stimuli.

In some embodiments, the nitrogen-stabilizing composition disclosed herein is less volatile compared to compositions containing a nitrogen stabilizer with no cyclic organic acid anhydride component. In some embodiments, the nitrogen-stabilizing composition is at least 10%, 20%, 30%, 40%, 50%, 60%, 70%, 80%, 90%, or at least 95% less volatile compared to a composition containing a nitrogen stabilizer with no cyclic organic acid anhydride component.

In some embodiments, the nitrogen-stabilizing composition disclosed herein inhibits the decomposition of urea. In some embodiments, the nitrogen-stabilizing composition inhibits the decomposition of urea by at least 10%, 20%, 30%, 40%, 50%, 60%, 70%, 80%, 90%, or at least 95%.

In some embodiments, the nitrogen-stabilizing composition provides a steady and continuous release of the nitrogen stabilizer component. The amount of nitrogen stabilizer component being released over a given time period can vary. A skilled artisan would be aware how to modulate the release of the nitrogen stabilizer component accordingly. For example, a skilled artisan would be aware of how to modulate the release characteristics of a particular nitrogen stabilizer by choosing the proper organic acid anhydride component to achieve the desired release rate of the nitrogen stabilizer over a certain time period.

In some embodiments, a nitrogen stabilizer component is released from the nitrogen-stabilizing composition at a steady concentration, ranging from about 1 to about 100 mg/g, about 1 to about 75 mg/g, about 1 to about 50 mg/g, about 1 to about 40 mg/g, about 1 to about 30 mg/g, about 1 to about 20 mg/g, about 1 to about 10 mg/g, or from about 1 to about 5 mg/g.

In some embodiments, a nitrogen stabilizer component is released from the nitrogen-stabilizing composition over a time period of 1-4 weeks, 1-3 weeks, or 1-2 weeks. In some embodiments, a nitrogen stabilizer component is released from the nitrogen-stabilizing composition over a time period of 1-30 days, 1-20 days, 1-10 days or over a time period of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 or 31 days. In some embodiments, a nitrogen stabilizer component is released from the nitrogen-stabilizing composition over a time period of about 1-6 months, 1-5 months, 1-4 months, 1-3 months, or of about 1-2 months.

In some embodiments, a nitrogen stabilizer component is released from the nitrogen-stabilizing composition at a concentration ranging from about 1 to about 20 mg/g over a time period of at least 10 days.

II. Formulation

Generally, the nitrogen-stabilizer composition can be used neat or can be solvated and/or formulated with a vehicle, such as an organic solvent, as well as other ingredients to form useful formulations. In some embodiments, the described nitrogen-stabilizer compositions contain relatively little to no water. Thus, in some embodiments, the amount of water present in neat a nitrogen-stabilizer composition is less than about 10%, about 9%, about 8%, about 7%, about 6%, about 5%, about 4%, about 3%, about 2%, about 1%, or is less than 0.5% w/w based on the total weight of the nitrogen-stabilizer composition.

A. Vehicle

In some embodiments, the vehicle solvating the neat nitrogen-stabilizer composition comprises one or more organic solvents. For example, in some embodiments, the vehicle comprises/consists of/consists essentially of an organic solvent selected from a glycol-based solvent, a lactone-based solvent, an aprotic solvent, an alcoholic solvent, an amine stabilizer, and a combination thereof. In some embodiments, the vehicle comprises/consists of/consists essentially of an organic solvent selected from lactone-based solvents, dipolar aprotic solvents, amine stabilizers, and a combination thereof. For example, in some embodiments, the vehicle comprises/consists of/consists essentially of an organic solvent selected from 4-butyl-gamma-butyrolactone, N-methyl-2-pyrrolidone, dimethyl sulfoxide (DMSO), monoethanolamine, and a combination thereof. In some embodiments, the vehicle comprises/consists of/consists essentially of an organic solvent selected from an aprotic solvent, an amine stabilizer, and a combination thereof. In some embodiments, the vehicle is DMSO and monoethanolamine.

In some embodiments, the vehicle comprises/consists of/consists essentially of an aprotic solvent. Suitable aprotic solvents include, for example, dichloromethane, dimethyl acetamide, dimethyl formamide, dimethyl sulfoxide (DMSO), ethyl acetate, acetone, acetonitrile, hexamethylphosphoramide, dimethyl sulfone, sulfolane, 1,3-dimethyl-2-imidazoidinone, 1,3-dimethyl-3,4,5,6-tetrahydro-2 (1H)-pyrimidone, methyl acetate, ethyl lactate, N-methylpyrrolidone, tetrahydrofuran, and propylene carbonate. In some embodiments, the aprotic solvent is DMSO.

In some embodiments, the vehicle comprises/consists of/consists essentially of an amine stabilizer. Exemplary amine stabilizer include, but are not limited to, 1,2-diaminocyclohexane (DCH), bis(hexamethylene)triamine (BHT), monomethanolamine, monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol, or a heterocyclic ring that comprises at least one nitrogen atom as a ring member and/or is substituted on at least one carbon atom with an amino group and that is substituted on at least one other carbon atom with a hydroxyalkyl or hydroxyl group, such as methylaminomethyl-1,3-dioxolane. In some embodiments, the amine stabilizer is monomethanolamine.

In some embodiments, the vehicle comprises/consists of/consists essentially of a glycol-based solvent. Glycols and glycol-based solvents include but are not limited to aliphatic dihydroxy (dihydric) alcohols. In one embodiment, glycol-based solvents include but are not limited to polypropylene glycol, triethylene glycol, glycol alkyl ethers such as dipropylene glycol methyl ether, diethylene glycol. In another embodiment, glycol-based solvents include but are not limited to polyglycols such as polyethylene glycols (PEG) and polypropylene glycols.

Glycols are represented by the general formula $C_nH_{2n}(OH)_2$, where n is at least 2. Non-limiting examples of glycols include ethylene glycol (glycol), propylene glycol (1,2-propanediol), 1,4-butanediol, 1,5-pentanediol, 1,6-hexanediol, 1,7-heptanediol, 1,9-nonanediol, 1,10-decanediol, 1,8-octanediol, 1,3-propanediol, 1,3-butanediol, 1,4-butanediol, 2,3-butanediol, 2,4-pentanediol, 2,5-hexanediol, 4,5-octanediol and 3,4-hexanediol, neopenty glycol, pinacol, 2,2-diethyl-1,3-propanediol, 2-ethyl-1,3-hexanediol, 2-ethyl-2-butyl-1,3-propanediol, isobutylene glycol, 2,3-dimethyl-1,3-propanediol, 1,3-diphenyl-1,3-propanediol, 3-methyl-1,3-butanediol. Polyglycol-based solvents include but are not limited to polyethylene glycol (PEG) 200-6000 mono and dilaurates, such as, PEG 600 dilaurate, PEG 600 monolaurate, PEG 1000 dilaurate, PEG 1000 monolaurate, PEG 1540 dilaurate and PEG 1540 monolaurate, polyethylene glycol 200-6000 mono and dioleates, such as, PEG 400 monoleate, PEG 600 dioleate, PEG 600 monooleate, PEG 1000 monoleate, PEG 1540 dioleate, PEG 1540 monooleate and polyethylene glycol 200-6000 mono and distearates, such as, PEG 400 distearate, PEG 400 monostearate, PEG 600 distearate, PEG 600 monostearate, PEG 1000 distearate, PEG 1000 monostearate, PEG 1540 distearate, PEG 1540 monostearate and PEG 3000 monostearate.

In some embodiments, the vehicle comprises/consists of/consists essentially of a lactone-based solvent. Lactones are cyclic carboxylic esters of varying ring sizes. In some embodiments, the lactone-based solvent is selected from a α-acetolactone, β-propiolactone, γ-butyrolactone, and 6-valerolactone. In some embodiments, the α-acetolactone, β-propiolactone, γ-butyrolactone, and/or 6-valerolactone is optionally substituted, e.g., with alkyl group or a halogen. Exemplary lactone-based solvents include, but are not limited to, 4-butyl-gamma-butyrolactone, mucobromic acid, mucochloric acid, beta-butyrolactone, gamma-butyrolactone, 3-hydroxy-gamma-butyrolactone, alpha-methylene-gamma-butyrolactone and gamma-valerolactone.

In some embodiments, the vehicle comprises/consists of/consists essentially of an alcoholic solvent. An alcoholic solvent is any organic solvent that contains a hydroxyl group (—OH). Exemplary alcoholic solvents include, but are not limited to, ethanol, methanol, ter-amyl alcohol, 2-methyl-1-butanol, 2-kethyl-1-pentanol, 3-methyl-2-butanol, furfuryl alcohol, 2-butanol, N-butanol, isobutanol, isopropyl alcohol, 2-pentanol, 1-propanol, and combinations thereof.

In some embodiments, the vehicle is relatively free of water. In some embodiments, the vehicle (e.g., organic solvent) contains less than about 10% w/w, about 9% w/w, about 8% w/w, about 7% w/w, about 6% w/w, about 5% w/w, about 4% w/w, about 3% w/w, about 2% w/w, about 1% w/w, about 0.9% w/w, about 0.8% w/w, about 0.7% w/w, about 0.6% w/w, about 0.5% w/w, about 0.4% w/w, about 0.3% w/w, or less than about 0.1% w/w of water based on the total weight of the vehicle.

B. Formulation

The vehicle disclosed herein can be employed in formulations containing the above-described nitrogen-stabilizing compositions and/or components thereof to afford formulations exhibiting numerous beneficial properties such as, but not limited to, thermal and/or chemical formulation stability, increased formulation shelf life, reduced formulation volatility, reduced application rate, improved formulation viscosity, absence of any strong undesirable odors or smells, ease in preparation of the formulation, ease of formulation handling, extended/prolonged effect of urease and nitrification inhibition, as well as excellent environmental and toxicology profiles.

In some embodiments, the formulation comprises the disclosed nitrogen-stabilizing composition and the vehicle as described above. The amount of the nitrogen-stabilizing composition present in the formulation can vary. For example, in some embodiments, the amount of nitrogen-stabilizing composition present in the formulation ranges from about 5% to about 50%, from about 10% to about 45%, from about 15% to about 40%, from about 20% to about 35%, or from about 25% to about 30% w/w based on the total weight of the formulation. In some embodiments, the amount of nitrogen-stabilizing composition present in the formulation ranges from about 1% to about 75%, from about 10% to about 65%, from about 20% to about 65%, from about 30% to about 65%, or from about 40% to about 65% w/w based on the total weight of the formulation. In some embodiments, the amount of nitrogen-stabilizing composition present in the formulation ranges from about 1% to about 40%, from about 10% to about 35%, from about 15% to about 35%, from about 20% to about 35%, from about 25% to about 35%, from about 27% to about 35%, or from about 30% to about 35% w/w based on the total weight of the formulation. In some embodiments, the amount of nitrogen-stabilizing composition present in the formulation ranges from about 15% to about 30%, from about 15% to about 28%, from about 15% to about 25%, or from about 15% to about 23% w/w based on the total weight of the formulation. In some embodiments, the amount of nitrogen-stabilizing composition present in the formulation ranges from about 25% to about 40%, from about 25% to about 35%, from about 22% to about 28%, or from about 22% to about 33% w/w based on the total weight of the formulation.

In some embodiments, the amount of the nitrogen-stabilizer component (which is part of the nitrogen-stabilizing composition) can vary. In some embodiment, the amount of nitrogen-stabilizer component is present in the formulation ranges from about 1% to about 50%, from about 5% to about 50%, from about 5% to about 40%, from about 10% to about 40%, from about 10% to about 30%, or from about 10% to about 25% w/w based on the total weight of the formulation. In some embodiments, the amount of nitrogen-stabilizer component present in the formulation ranges from about 5% to about 30% from about 5% to about 25%, from about 5% to about 20%, from about 5% to about 15%, or from about 5% to about 10%. In some embodiments, the amount of nitrogen-stabilizer component present in the formulation ranges from about 15% to about 30%, from about 15% to about 25%, or from about 15% to about 20%. In some embodiments, the nitrogen-stabilizer component is a urease inhibitor. In some embodiments, the nitrogen-stabilizer component is a nitrification inhibitor. In some embodiments, the nitrogen-stabilizer component is a nitrification inhibitor and a urease inhibitor.

In some embodiments, the nitrogen-stabilize component comprises a urease inhibitor. The amount of urease inhibitor (which is part of the nitrogen-stabilizer component) present in the formulation can vary. For example, in some embodiments, the amount of urease inhibitor present in the formulation ranges from about 5% to about 50%, 5% to about 25%, from 5% to about 20%, or from 5% to about 15% w/w based on the total weight of the formulation. In some embodiments, the amount of urease inhibitor present in the formulation ranges from about 5% to about 30% from about 5% to about 25%, from about 5% to about 20%, from about 5% to about 15%, from about 5% to about 10%, or from about 5% to about 8.5% w/w based on the total weight of the formulation. In some embodiments, the amount of urease inhibitor present in the formulation ranges from about 15% to about 25%, from about 15% to about 20%, or from about 10% to about 20%, from about 10% to about 15% from about 12.5% to about 15%, or from about 7.5% to about 20%, from about 8.5% to about 20%, from about 8.5% to about 15%, or from about 8.5% to about 12.5%. In some embodiments, the urease inhibitor is NBPT.

In some embodiments, the nitrogen-stabilizer component comprises a nitrification inhibitor. The amount of nitrification inhibitor present in the formulation can vary. For example, in some embodiments, the amount of nitrification inhibitor present in the formulation ranges from about 1% to about 30%, from about 5% to about 25%, from about 5 to about 20%, from 5% to about 10%, or from 10% to about 20% w/w based on the total weight of the formulation. In some embodiments, the amount of nitrification inhibitor present in the formulation ranges from about 5% to about 30% from about 5% to about 25%, from about 5% to about 20%, from about 5% to about 15%, from about 5% to about 10%, or from about 5% to about 7.5% w/w based on the total weight of the formulation. In some embodiments, the amount of urease inhibitor present in the formulation ranges from about 15% to about 25%, from about 15% to about 20%, or from about 10% to about 25%, from about 10% to about 20% from about 10% to about 15%, or from about 7.5% to about 25%, or from about 7.5% to about 15%. In some embodiments, the nitrification inhibitor is DCD.

In some embodiments, the amount of organic acid anhydride component (which is part of the nitrogen-stabilizing composition) present in the formulation ranges from about 1% to about 20%, from about 1% to about 15%, or from about 1% to about 10% w/w based on the total weight of the formulation. In some embodiments, the amount of organic acid anhydride component present in the formulation ranges from about 5% to about 15%, from about 5% to about 10%, or from about 5% to about 8%. In some embodiments, the organic acid anhydride component is a polymer as disclosed herein.

In some embodiments, the vehicle can be used to solvate and/or formulate one or more components of the nitrogen-stabilizing composition. For example, in some embodiments, the formulation comprises a nitrogen-stabilizer composition and a vehicle as disclosed herein. In some embodiments, the formulation comprises a urease inhibitor and a vehicle as disclosed herein. In some embodiments, the urease inhibitor is NBPT.

In some embodiments, the formulation comprises a nitrification inhibitor and a vehicle as disclosed herein. In some embodiments, the nitrification inhibitor is DCD.

In some embodiments, the formulation comprises a nitrification inhibitor, a urease inhibitor and a vehicle as disclosed herein. In some embodiments, the nitrification inhibitor is DCD and the urease inhibitor is NBPT.

In some embodiments, the formulation comprises an organic acid anhydride component and a vehicle as disclosed herein. In some embodiments, the organic acid anhydride component is a polymer as disclosed herein.

The vehicle to solvate and/or formulate the above mentioned compositions and/or components comprises an aprotic solvent and an amine stabilizer. A skilled artisan would be aware that the amount of aprotic solvent and amine stabilizer present in the formulation could vary. For example, in some embodiments, the amount of aprotic solvent ranges from about to about 1% to about 80%, from about 10% to about 80%, from about 20% to about 80%, from about 40% to about 80%, 50% to about 75%, from about 55% to about 75%, or from about 60% to about 75% w/w based on the total weight of the formulation. In some embodiment, the amount of aprotic solvent present in the formulation ranges from about 10% to about 75%, from about 10% to about 60%, from about 10% to about 50%, from about 10% to about 45%, or from about 20% to about 45% w/w based on the total weight of the formulation.

In some embodiments, the amount of aprotic solvent is less than about 80%, about 75%, about 70%, about 65%, about 60%, about 55%, about 50%, about 45%, about 40%, about 30%, or about 20% w/w based on the total weight of the formulation. In some embodiments, the amount of aprotic solvent is more than about 5%, about 10%, about 15%, about 20%, about 25%, about 30%, about 35%, about 40%, about 45%, about 50%, about 55%, about 60%, about 65%, about 70% about 75% w/w based on the total weight of the formulation. In some embodiments, the aprotic solvent is DMSO. In some embodiments, the amount of amine stabilizer ranges from about 1% to about 15%, from about 5% to about 10%, from about 3 to about 8%, or from about 8 to about 12% w/w based on the total weight of the formulation. In some embodiments, the amount of amine stabilizer is less than about 15%, about 14%, about 13%, about 12%, about 11%, about 10%, about 9%, about 8%, about 7%, about 6%, about 5%, about 4%, about 3%, about 2%, or about 1% w/w based on the total weight of the formulation. In some embodiments, the amount of amine stabilizer is more than about 1%, about 2%, about 3%, about 4%, about 5%, about 6%, about 7%, about 8%, about 9%, about 10%, or about 12% w/w based on the total weight of the formulation. In some embodiments, the amine stabilizer is monomethanolamine.

Thus, in some embodiments, the formulation as disclosed herein comprises a nitrogen-stabilizer composition and an aprotic solvent and an amine stabilizer.

In some embodiments, the formulation as disclosed herein comprises a nitrogen-stabilizer component; an aprotic solvent; and an amine stabilizer.

In another embodiment, the formulation as disclosed herein comprise an organic acid anhydride component; an aprotic solvent; and an amine stabilizer As in any above embodiment, a formulation wherein the nitrogen-stabilizing comprises a nitrogen stabilizer component; and an organic acid anhydride component.

As in any above embodiment, a formulation wherein the nitrogen stabilizer component is a urease inhibitor and/or nitrification inhibitor.

In some embodiments, the formulation as disclosed herein comprises a nitrogen-stabilizing composition comprising a nitrogen stabilizer component; and an organic acid anhydride component, wherein the nitrogen stabilizer component is a urease inhibitor and/or nitrification inhibitor; an aprotic solvent; and an amine stabilizer.

As in any above embodiment, a formulation wherein the nitrogen stabilizer component is N-(n-butyl) thiophosphoric triamide (NBPT) and/or dicyanamide (DCD).

As in any above embodiment, a formulation wherein the organic acid anhydride component is an organic acid anhydride polymer.

As in any above embodiment, a formulation wherein the organic acid anhydride polymer is a copolymer containing at least two different repeat units, including one of type B repeat unit and one of type C repeat unit.

As in any above embodiment, a formulation wherein the copolymer is a random copolymer.

As in any above embodiment, a formulation wherein the type B repeat unit is derived from (un)substituted monomers of maleic anhydride, itaconic anhydride, or a combination thereof.

As in any above embodiment, a formulation wherein the type B repeat unit is derived from (un)substituted monomers of maleic anhydride.

As in any above embodiment, a formulation wherein at least about 50 mole % of the repeat units of the organic acid anhydride polymer are type B repeat units.

As in any above embodiment, a formulation wherein the organic acid anhydride polymer contains a type C repeat unit that is derived from (un)substituted alkene(s).

As in any above embodiment, a formulation wherein the alkene is selected from ethylene, propylene, butylene, isobutylene, styrene, methyl vinyl ether and a combination thereof.

As in any above embodiment, a formulation wherein the organic acid anhydride polymer has a structure according to formula:

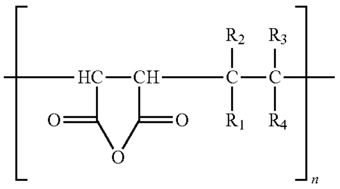

wherein R1 R2, R3 and R4 are independently selected from —H, —COOH, —COOR, —OCOH, —OCOR, —OR, —CN, —SO2R, —SO3R, —COR, —CONH2, —CONHR, —CONR2, —CHO, NO2, halogen alkyl, -cycloalkyl, -aryl, -alkaryl, or aralkyl, wherein R is a (un)substituted C1-C8 alkyl group, a (un)substituted C2-C8 alkenyl group, a (un)substituted aryl group, a (un)substituted heteroaryl group; and n is an integer greater than 2.

As in any above embodiment, a formulation wherein the aprotic solvent is selected from dichloromethane, dimethyl acetamide, dimethyl formamide, dimethyl sulfoxide (DMSO), ethyl acetate, acetone, acetonitrile, hexamethylphosphoramide, dimethyl sulfone, sulfolane, 1,3-dimethyl-2-imidazoidinone, 1,3-dimethyl-3,4,5,6-tetrahydro-2 (1H)-pyrimidone, methyl acetate, ethyl lactate, N-methylpyrrolidone, tetrahydrofuran, and propylene carbonate.

As in any above embodiment, a formulation wherein the aprotic solvent is dimethyl sulfoxide (DMSO).

As in any above embodiment, a formulation wherein the amine stabilizer is selected from 1,2-diaminocyclohexane (DCH), Bis(hexamethylene)triamine (BHT), monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol.

As in any above embodiment, a formulation wherein the amine stabilizer is monoethanolamine.

As in any above embodiment, a formulation comprising DCD, NBPT, and a polymer as disclosed herein formulated in DMSO and monomethanolamine.

As in any above embodiment, a formulation wherein the nitrogen-stabilizing composition is present in an amount of from about 5% to about 50% w/w based on the total weight of the stabilizing formulation.

As in any above embodiment, a formulation wherein the aprotic solvent is present in an amount of from about 50% to about 75% w/w based on the total weight of the stabilizing formulation.

As in any above embodiment, a formulation wherein the amine stabilizer is present in an amount of from about 3% to about 8% w/w based on the total weight of the stabilizing formulation.

As in any above embodiment, a formulation wherein the nitrogen-stabilizer component is present in an amount of from about 5% to about 50% w/w based on the total weight of the stabilizing formulation.

As in any above embodiment, a formulation wherein the nitrogen-stabilizer component comprises a urease inhibitor that is present in an amount of from about 5% to about 20% w/w based on the total weight of the stabilizing formulation and a nitrification inhibitor that is present in an amount of from about 5% to about 20% w/w based on the total weight of the stabilizing formulation.

As in any above embodiment, a formulation, wherein the nitrogen-stabilizer component comprises a urease inhibitor that is present in an amount of from about 5% to about 20% w/w and a nitrification inhibitor that is present in an amount of from about 5% to about 20% w/w, and a polymer as disclosed herein that is present in an amount of from about 1% to about 10%; and a vehicle comprising an aprotic solvent that is present in an amount of from about 45% to about 75% and an amine stabilizer that is present in an amount of from about 3% to about 8% w/w, wherein all weights are based on the total weight of the stabilizing formulation. In some embodiments, the formulation disclosed herein is chemically and/or thermally more stable compared to formulation containing a nitrogen-stabilizing composition with no organic acid anhydride component present. In some embodiments, the formulation is at least 10%, 20%, 30%, 40%, 50%, 60%, 70%, 80%, 90%, or at least 95% more chemically stable compared to a formulation containing a nitrogen-stabilizing composition with no organic acid anhydride component. In some embodiments, the formulation is at least 10%, 20%, 30%, 40%, 50%, 60%, 70%, 80%, 90%, or at least 95% more thermally stable compared to a formulation containing a nitrogen-stabilizing composition with no organic acid anhydride component. The thermal and/or chemical stability of the disclosed formulations is measured as a function of the amount of nitrogen stabilizer being present after a certain amount of time when exposed to chemical and/or thermal/stimuli.

In some embodiments, the formulation disclosed herein is less volatile compared to formulations containing a nitrogen-stabilizing composition with no organic acid anhydride component. In some embodiments, the formulation is at least 10%, 20%, 30%, 40%, 50%, 60%, 70%, 80%, 90%, or at least 95% less volatile compared to formulations containing a nitrogen-stabilizing composition with no organic acid anhydride component.

In some embodiments, the formulation disclosed herein exhibits improved viscosity compared to formulations containing a nitrogen-stabilizing composition with no organic acid anhydride component. In some embodiments, the viscosity of the disclosed formulation ranges from about 50 to about 1,740 cps, when measured at room temperature (25.5° C.). In some embodiments, the viscosity of the disclosed formulation ranges from about 200 to about 9,500 cps, when measured at about 2° C.

In some embodiments, the formulations disclosed herein comprise no strong undesirable smells and\or odors. Undesirable odors or smells may be characterized as in having a sulfur-containing smell or odor. Surprisingly, the formulations as disclosed herein do not exhibit any undesirable smells and/or odors despite their content of DMSO. The lack of undesirable smells and/or odors makes the formulation more user friendly compared to other formulations, which may exhibit undesirable smells and/or odors. The detection and/or identification of any undesirable smells and/or odors originating from a formulation can be done using known methods in the art. Exemplary methods include, but are not limited to, vapor pressure measurements and/or gas chromatography to detect and/or identify organic compounds that are known to exhibit undesirable smells and/or odors.

For example, a decrease in vapor pressure of a formulation is correlated with a decrease in undesirable smells and/or odors of that particular formulation. Thus, in some embodiments, the formulations as disclosed herein exhibit a reduction of at least about 5%, about 10%, about 15%, about 20%, about 25%, about 30%, about 35%, about 40, about 45%, about 50%, about 55% in vapor pressure compared to commercially available formulations (e.g., Eco Argo's NEON™ family of products).

Devices to measure and identify undesirable smells and/or orders can also be used. Exemplary devices include an odor meter, electronic nose, which can electronically "smell" undesirable odors and/or smells (e.g., see U.S. Pat. No. 10,603,858, which is hereby incorporated by reference in its entirety) and the like. For example, exemplary methods for using devices such as an electronic nose for detecting undesirable odors and/or smell may comprise placing the formulation as disclosed herein in a closed container; sealing the container for a certain time period; reopening the container; and electronically smelling by an electronic nose the formulation, wherein the step of electronically smelling by the electronic nose is performed in order to determine whether the formulation has a sulfurous smell. In some embodiments, the container may be exposed to elevated temperatures during the sealing step. In some embodiments, the electronically smelling comprises drawing airborne articles into a sample chamber sensing the airborne particulates by a plurality of sensors; processing data obtained from the plurality of sensors to determine if any of the airborne particulates are airborne particulates of the formulation; and indicating the presence and/or quantity of airborne particulates of the formulation that are present.

As such, in some embodiments, the formulations as disclosed herein exhibit a reduction in response rate of at least about 5%, 10%, 15%, 20%, 25%, 30%, 35%, 40%, 45%, 50% compared to the response rate of commercially available formulations (e.g., Eco Argo's NEON™ family products).

III. Agricultural Compositions

Any of the described nitrogen-stabilizing compositions and/or formulations can be combined with one or more other ingredients selected from the group consisting of fertilizer, agriculturally active compounds, seed, pesticides, herbicides, insecticides, fungicides, miticides and the like.

In some embodiments, the described nitrogen-stabilizing compositions and/or formulations may be mixed with the fertilizer products, applied as a surface coating to the fertilizer products, or otherwise thoroughly mixed with the fertilizer products. In some embodiments, in such combined fertilizer/nitrogen-stabilizing composition products, the fertilizer is in the form of particles having an average diameter of from about powder size (less than about 0.001 cm) to about 10 mm, more preferably from about 0.1 mm to about 5 mm, and still more preferably from about 0.15 mm to about 3 mm. The nitrogen-stabilizing composition and/or formulation can be present in such combined products at a level of about 0.001 g to about 20 g per 100 g fertilizer, about 0.01 to 7 g per 100 g fertilizer, about 0.08 g to about 5 g per 100 g fertilizer, or about 0.09 g to about 2 g per 100 g fertilizer. In the case of the combined fertilizer/nitrogen-stabilizing composition products, the combined product can be applied at a level so that the amount of nitrogen-stabilizing composition and/or formulation applied is about 10-150 g per acre of soil, about 30-125 g per acre, or about 40-120 g per acre of soil. The combined products can likewise be applied as liquid dispersions or as dry granulated products at the discretion of the user. When nitrogen-stabilizing compositions and/or formulations are used as a coating, the nitrogen-stabilizing composition and/or formulation can comprise between about 0.005% and about 15% by weight of the coated fertilizer product, about 0.01% and about 10% by weight of the coated fertilizer product, about 0.05% and about 2% by weight of the coated fertilizer product or about 0.5% and about 1% by weight of the coated fertilizer product.

A. Fertilizers

In some embodiments, the agricultural product is a fertilizer. The fertilizer can be a solid fertilizer, such as, but not limited to a granular and/or prill-like fertilizer, and the nitrogen-stabilizing composition and/or formulation can be applied to the fertilizer as a liquid dispersion or can be intermixed therewith. The fertilizer can also be in a semi-solid form (e.g., manure) where the nitrogen-stabilizing composition and/or formulation can also be applied to the fertilizer as a liquid dispersion or can be intermixed therewith. The fertilizer can also be in liquid form, and the nitrogen-stabilizing composition and/or formulation can be mixed with the liquid fertilizer.

In some embodiments, the fertilizer is or contains urea and/or ammonia, including anhydrous ammonia fertilizer. In the case of a liquid fertilizer, such as UAN, the nitrogen-stabilizing composition and/or formulation is usually mixed with the fertilizer liquid in appropriate quantities. In the liquid fertilizers containing urea, the urea is usually present at a level of from about 1-12 moles/L, more preferably from about 2-10 moles/L. Another alternative would be to impregnate urea or the fertilizer containing urea with the nitrogen-stabilizing composition during manufacture of such products. While the compositions should contain urea in some form, other types of fertilizers may be used in the agricultural composition.

Such additional secondary fertilizers can be selected from the group consisting of starter fertilizers, phosphate-based fertilizers, fertilizers containing nitrogen, fertilizers containing phosphorus, fertilizers containing potassium, fertilizers containing calcium, fertilizers containing magnesium, fertilizers containing boron, fertilizers containing chlorine, fertilizers containing zinc, fertilizers containing manganese, and/or fertilizers containing copper. In some embodiments, the additional fertilizer comprises plant-available nitrogen, phosphorous, potassium, sulfur, calcium, magnesium or micronutrients. In some embodiments, the fertilizer is solid, granular, a fluid suspension, a gas, or a solutionized fertilizer. In some embodiments, the fertilizer comprises a micronutrient. A micronutrient is an essential element required by a plant in small quantities. In some embodiments, the fertilizer comprises a metal ion selected from the group consisting of. Fe, Mn, Mg, Zn, Cu, Ni, Co, Mo, V and Ca. In some embodiments, the fertilizer comprises gypsum, Kieserite Group member, potassium product, potassium magnesium sulfate, elemental sulfur, or potassium magnesium sulfate. Such fertilizers may be granular, liquid, gaseous, or mixtures (e.g., suspensions of solid fertilizer particles in liquid material). In some embodiments, the additional fertilizer is an NPK fertilizer.

Generally, the amount of such secondary fertilizers would be less than that of the urea fraction. Such dual fertilizer compositions containing the nitrogen stabilizer composition disclosed herein may be used exactly in the same fashion and in the same quantities as the corresponding urea fertilizer products for applications to fields and/or crops. In the case of solids or semi-solids, the products may be applied in the same quantities by broadcast, deep or sub-surface placement, localized placement, contact, band, hill, and row placement, before during or after planting. Liquid compositions would typically be applied by incorporating the liquid into the soil by knife-in or other conventional methods.

When the described nitrogen stabilizer composition, or formulations thereof, is applied with the application of one or more fertilizers, the nitrogen stabilizer composition can be applied prior to, subsequent to, or simultaneously with the application of fertilizer(s).

As mentioned above, the fertilizer compositions containing the nitrogen stabilizer composition and/or formulation as disclosed herein can be applied in any manner, which will benefit the crop of interest. In some embodiment, such compositions are applied to or throughout the growth medium prior to seeding or transplanting the desired crop plant. In some embodiments, the compositions can be applied to the root zone of growing plants.

B. Seed

In some embodiments, agricultural seeds are coated with one or more of the described nitrogen stabilizer compositions and/or formulations. The nitrogen stabilizer composition and/or formulation can be present in the seed product at a level of from about 0.001-10%, about 0.004%-2%, about 0.01% to about 1%, or from about 0.1% to about 1% by weight (or no more than about 10%, about 9%, about 8%, about 7% about 6%, about 5%, about 4%, about 3%, about 2%, about 1%, about 0.5%, about 0.1%, about 0.01% or no more than 0.001%), based upon the total weight of the coated seed product. A seed can be, but is not limited to, wheat, barley, oat, triticale, rye, rice, maize, soya bean, cotton, or oilseed rape.

C. Other

In some embodiments, pesticides, herbicides, insecticides, fungicides, and/or miticides are combined with one or more of the described nitrogen stabilizer compositions and/or formulations. As used herein, "pesticide" refers to any agent with pesticidal activity (e.g., herbicides, insecticides, fungicides) and is preferably selected from the group consisting of insecticides, herbicides, and mixtures thereof, but normally excluding materials which assertedly have plant-fertilizing effect, for example sodium borate and zinc compounds such as zinc oxide, zinc sulfate, and zinc chloride. For a non-limiting list of pesticides, see "Farm Chemicals Handbook 2000, 2004" (Meister Publishing Co, Willoughby, OH), which is hereby incorporated by reference in its entirety.

Exemplary herbicides include, but are not limited to acetochlor, alachlor, aminopyralid, atrazine, benoxacor, bromoxynil, carfentrazone, chlorsulfuron, clodinafop, clopyralid, dicamba, diclofop-methyl, dimethenamid, fenoxaprop, flucarbazone, flufenacet, flumetsulam, flumiclorac, fluroxypyr, glufosinate-ammonium, glyphosate, halosulfuron-methyl, imazamethabenz, imazamox, imazapyr, imazaquin, imazethapyr, isoxaflutole, quinclorac, MCPA, MCP amine, MCP ester, mefenoxam, mesotrione, metolachlor, s-metolachlor, metribuzin, metsulfuron-methyl, nicosulfuron, paraquat, pendimethalin, picloram, primisulfuron, propoxycarbazone, prosulfuron, pyraflufen ethyl, rimsulfuron, simazine, sulfosulfuron, thifensulfuron, topramezone, tralkoxydim, triallate, triasulfuron, tribenuron, triclopyr, trifluralin, 2,4-D, 2,4-D amine, 2,4-D ester and the like.

Exemplary insecticides include, but are not limited to 1,2-dichloropropane, 1,3-dichloropropene, abamectin, acephate, acequinocyl, acetamiprid, acethion, acetoprole, acrinathrin, acrylonitrile, alanycarb, aldicarb, aldoxycarb, aldrin, allethrin, allosamidin, allyxycarb, alpha cypermethrin, alpha ecdysone, amidithion, amidoflumet, aminocarb, amiton, amitraz, anabasine, arsenous oxide, athidathion, azadirachtin, azamethiphos, azinphos-ethyl, azinphos-methyl, azobenzene, azocyclotin, azothoate, barium hexafluorosilicate, barthrin, benclothiaz, bendiocarb, benfuracarb, benoxafos, bensultap, benzoximate, benzyl benzoate, beta cyfluthrin, beta cypermethrin, bifenazate, bifenthrin, binapacryl, bioallethrin, bioethanomethrin, biopermethrin, bistrifluron, borax, boric acid, bromfenvinfos, bromo DDT, bromocyclen, bromophos, bromophos-ethyl, bromopropylate, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, chinomethionat, chlorantraniliprole, chlorbenside, chlorbicyclen, chlordane, chlordecone, chlordimeform, chlorethoxyfos, chlorfenapyr, chlorfenethol, chlorfenson, chlorfensulphide, chlorfenvinphos, chlorfluazuron, chlormephos, chlorobenzilate, chloroform, chloromebuform, chloromethiuron, chloropicrin, chloropropylate, chlorphoxim, chlorprazophos, chlorpyrifos, chlorpyrifos-methyl, chlorthiophos, chromafenozide, cinerin I, cinerin II, cismethrin, cloethocarb, clofentezine, closantel, clothianidin, copper acetoarsenite, copper arsenate, copper naphthenate, copper oleate, coumaphos, coumithoate, crotamiton, crotoxyphos, cruentaren A & B, crufomate, cryolite, cyanofenphos, cyanophos, cyanthoate, cyclethrin, cycloprothrin, cyenopyrafen, cyflumetofen, cyfluthrin, cyhalothrin, cyhexatin, cypermethrin, cyphenothrin, cyromazine, cythioate, d-limonene, dazomet, DBCP. DCIP, DDT, decarbofuran, deltamethrin, demephion, demephion O, demephion S, demeton, demeton methyl, demeton O, demeton O methyl, demeton S, demeton S methyl, demeton S methylsulphon, diafenthiuron, dialifos, diamidafos, diazinon, dicapthon, dichlofenthion, dichlofluanid, dichlorvos, dicofol, dicresyl, dicrotophos, dicyclanil, dieldrin, dienochlor, diflovidazin, diflubenzuron, dilor, dimefluthrin, dimefox, dimetan, dimethoate, dimethrin, dimethylvinphos, dimetilan, dinex, dinobuton, dinocap, dinocap 4, dinocap 6, dinocton, dinopenton, dinoprop, dinosam, dinosulfon, dinotefuran, dinoterbon, diofenolan, dioxabenzofos, dioxacarb, dioxathion, diphenyl sulfone, disulfiram, disulfoton, dithicrofos, DNOC, dofenapyn, doramectin, ecdysterone, emamectin, EMPC, empenthrin, endosulfan, endothion, endrin, EPN, epofenonane, eprinomectin, esfenvalerate, etaphos, ethiofencarb, ethion, ethiprole, ethoate-methyl, ethoprophos, ethyl DDD, ethyl formate, ethylene dibromide, ethylene dichloride, ethylene oxide, etofenprox, etoxazole, etrimfos, EXD, famphur, fenamiphos, fenazaflor, fenazaquin, fenbutatin oxide, fenchlorphos, fenethacarb, fenfluthrin, fenitrothion, fenobucarb, fenothiocarb, fenoxacrim, fenoxycarb, fenpirithrin, fenpropathrin, fenpyroximate, fenson, fensulfothion, fenthion, fenthion-ethyl, fentrifanil, fenvalerate, fipronil, flonicamid, fluacrypyrim, fluazuron, flubendiamide, flubenzimine, flucofuron, flucycloxuron, flucythrinate, fluenetil, flufenerim, flufenoxuron, flufenprox, flumethrin, fluorbenside, fluvalinate, fonofos, formetanate, formothion, formparanate, fosmethilan, fospirate, fosthiazate, fosthietan, fosthietan, furathiocarb, furethrin, furfural, gamma cyhalothrin, gamma HCH, halfenprox, halofenozide, HCH, HEOD, heptachlor, heptenophos, heterophos, hexaflumuron, hexythiazox, HHDN, hydramethylnon, hydrogen cyanide, hydroprene, hyquincarb, imicyafos, imidacloprid, imiprothrin, indoxacarb, iodomethane, IPSP, isamidofos, isazofos, isobenzan, isocarbophos, isodrin, isofenphos, isoprocarb, isoprothiolane, isothioate, isoxathion, ivermectin jasmolin I, jasmolin II, jodfenphos, juvenile hormone I, juvenile hormone II, juvenile hormone III, kelevan, kinoprene, lambda cyhalothrin, lead arsenate, lepimectin, leptophos, lindane, lirimfos, lufenuron, lythidathion, malathion, malonoben, mazidox, mecarbam, mecarphon, menazon, mephosfolan, mercurous chloride, mesulfen, mesulfenfos, metaflumizone, metam, methacrifos, methamidophos, methidathion, methiocarb, methocrotophos, methomyl, methoprene, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, MNAF, monocrotophos, morphothion, moxidectin, naftalofos, naled, naphthalene, nicotine, nifluridide, nikkomycins, nitenpyram, nithiazine, nitrilacarb, novaluron, noviflumuron, omethoate, oxamyl, oxydemeton-methyl, oxydeprofos, oxydisulfoton, paradichlorobenzene, parathion, parathion-methyl, penfluron, pentachlorophenol, permethrin, phenkapton, phenothrin, phenthoate, phorate, phosalone, phosfolan, phosmet, phosnichlor, phosphamidon, phosphine, phosphocarb, phoxim, phoxim-methyl, pirimetaphos, pirimicarb, pirimiphos-ethyl, pirimiphos-methyl, potassium arsenite, potassium thiocyanate, pp' DDT, prallethrin, precocene I, precocene II, precocene III, primidophos, proclonol, profenofos, profluthrin, promacyl, promecarb, propaphos, propargite, propetamphos, propoxur, prothidathion, prothiofos, prothoate, protrifenbute, pyraclofos, pyrafluprole, pyrazophos, pyresmethrin, pyrethrin I, pyrethrin II, pyridaben, pyridalyl, pyridaphenthion, pyrifluquinazon, pyrimidifen, pyrimitate, pyriprole, pyriproxyfen, quassia, quinalphos, quinalphos, quinalphos-methyl, quinothion, quantifies, rafoxanide, resmethrin, rotenone, ryania, sabadilla, schradan, selamectin, silafluofen, sodium arsenite, sodium fluoride, sodium hexafluorosilicate, sodium thiocyanate, sophamide, spinetoram, spinosad, spirodiclofen, spiromesifen, spirotetramat, sulcofuron, sulfiram, sulfluramid, sulfotep, sulfur, sulfuryl fluoride, sulprofos, tau fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetradifon, tetramethrin, tetranactin, tetrasul, theta cypermethrin, thiacloprid, thiamethoxam, thicrofos, thiocarboxime, thiocyclam, thiodicarb, thiofanox, thiometon, thionazin, thioquinox, thiosultap, thuringiensin, tolfenpyrad, tralomethrin, transfluthrin, transpermethrin, triarathene, triazamate, triazophos, trichlorfon, trichlormetaphos 3, trichloronat, trifenofos, triflumuron, trimethacarb, triprene, vamidothion, vamidothion, vaniliprole, vaniliprole, XMC, xylylcarb, zeta cypermethrin and zolaprofos.

Exemplary fungicides include, but are not be limited to, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulfide, benalaxyl, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, bixafen, blasticidin-S, Bordeaux mixture, boric acid, boscalid, bridged diphenyl fungicides, bromuconazole, bupirimate, Burgundy mixture, buthiobate, sec-butylamine, calcium polysulfide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroform, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper(II) carbonate, basic, copper fungicides, copper hydroxide, copper naphthenate, copper oleate, copper oxychloride, copper(II) sulfate, copper sulfate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, diniconazole-M, dinitrophenol fungicides, dinobuton, dinocap, dinocap-4, dinocap-6, dinocton, dinopenton, dinosulfon, dinoterbon, diphenylamine, dipyrithione, disulfiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylene oxide, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, Fluconazole, fludioxonil, flumetover, flumorph, fluopicolide, fluoroimide, fluotrimazole, fluoxastrobin, fluquinconazole, flusilazole, flusulfamide, flutolanil, flutriafol, fluxapyroxad, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isopropyl alcohol, isoprothiolane, isovaledione, isopyrazam, kasugamycin, ketoconazole, kresoxim-methyl, Lime sulfur (lime sulphur), mancopper, mancozeb, maneb, mebenil, mecarbinzid, mepanipyrim, mepronil, mercuric chloride (obsolete), mercuric oxide (obsolete), mercurous chloride (obsolete), metalaxyl, metalaxyl-M (a.k.a. Mefenoxam), metam, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, morpholine fungicides, myclobutanil, myclozolin, N-(ethylmercury)-p-toluenesulfonanilide, nabam, natamycin, nystatin, β-nitrostyrene, nitrothal-isopropyl, nuarimol, OCH, octhilinone, ofurace, oprodione, organomercury fungicides, organophosphorus fungicides, organotin fungicides (obsolete), orthophenyl phenol, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulfamide fungicides, phosdiphen, Phosphite, phthalide, phthalimide fungicides, picoxystrobin, piperalin, polycarbamate, polymeric dithiocarbamate fungicides, polyoxins, polyoxorim, polysulfide fungicides, potassium azide, potassium polysulfide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfur, pyrrole fungicides, quinacetol, quinazamid, quinconazole, quinoline fungicides, quinomethionate, quinone fungicides, quinoxaline fungicides, quinoxyfen, quintozene, rabenzazole, salicylanilide, silthiofam, silver, simeconazole, sodium azide, sodium bicarbonate[2][3], sodium orthophenylphenoxide, sodium pentachlorophenoxide, sodium polysulfide, spiroxamine, streptomycin, strobilurin fungicides, sulfonanilide fungicides, sulfur, sulfuryl fluoride, sultropen, TCMTB, tebuconazole, tecloftalam, tecnazene, tecoram, tetraconazole, thiabendazole, thiadifluor, thiazole fungicides, thicyofen, thifluzamide, thymol, triforine, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, tridemorph, trifloxystrobin, triflumizole, triforine, triticonazole, unclassified fungicides, Undecylenic acid, uniconazole, uniconazole-P, urea fungicides, validamycin, valinamide fungicides, vinclozolin, voriconazole, zarilamid, zinc naphthenate, zineb, ziram, and/or zoxamide.

Exemplary classes of miticides include, but are not be limited to botanical acaricides, bridged diphenyl acaricides, carbamate acaricides, oxime carbamate acaricides, carbazate acaricides, dinitrophenol acaricides, formamidine acaricides, isoxaline acaricides, macrocyclic lactone acaricides, avermectin acaricides, milbemycin acaricides, milbemycin acaricides, mite growth regulators, organochlorine acaricides, organophosphate acaricides, organothiophosphate acaricides, phosphonate acaricides, phosphoarmidothiolate acaricies, organitin acaricides, phenylsulfonamide acaricides, pyrazolecarboxamide acaricdes, pyrethroid ether acaricide, quaternary ammonium acaricides, oyrethroid ester acaricides, pyrrole acaricides, quinoxaline acaricides, methoxyacrylate strobilurin acaricides, teronic acid acaricides, thiasolidine acaricides, thiocarbamate acaricides, thiourea acaricides, and unclassified acaricides. Examples of miticides for these classes include, but are not limited to, to botanical acaricides—carvacrol, sanguinarine; bridged diphenyl acaricides—azobenzene, benzoximate, benzyl, benzoate, bromopropylate, chlorbenside, chlorfenethol, chlorfenson, chlorfensulphide, chlorobenzilate, chloropropylate, cyflumetofen, DDT, dicofol, diphenyl, sulfone, dofenapyn, fenson, fentrifanil, fluorbenside, genit, hexachlorophene, phenproxide, proclonol, tetradifon, tetrasul; carbamate acaricides—benomyl, carbanolate, carbaryl, carbofuran, methiocarb, metolcarb, promacyl, propoxur; oxime carbamate acaricides—aldicarb, butocarboxim, oxamyl, thiocarboxime, thiofanox; carbazate acaricides—bifenazate; dinitrophenol acaricides—binapacryl, dinex, dinobuton, dinocap, dinocap-4, dinocap-6, dinocton, dinopenton, dinosulfon, dinoterbon, DNOC; formamidine acaricides—amitraz, chlordimeform, chloromebuform, formetanate, formparanate, medimeform, semiamitraz; isoxazoline acaricides—afoxolaner, fluralaner, lotilaner, sarolaner; macrocyclic lactone acaricides—tetranactin; avermectin acaricides—abamectin, doramectin, eprinomectin, ivermectin, selamectin; milbemycin acaricides—milbemectin, milbemycin, oxime, moxidectin; mite growth regulators— clofentezine, cyromazine, diflovidazin, dofenapyn, fluazuron, flubenzimine, flucycloxuron, flufenoxuron, hexythiazox; organochlorine acaricides—bromociclen, camphechlor, DDT, dienochlor, endosulfan, lindane; organophosphate acaricides—chlorfenvinphos, crotoxyphos, dichlorvos, heptenophos, mevinphos, monocrotophos, naled, TEPP, tetrachlorvinphos; organothiophosphate acaricides—amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton, demeton-O, demeton-S, demeton-methyl, demeton-O-methyl, demeton-S-methyl, demeton-S-methylsulphon, dialifos, diazinon, dimethoate, dioxathion, disulfoton, endothion, ethion, ethoate-methyl, formothion, malathion, mecarbam, methacrifos, omethoate, oxydeprofos, oxydisulfoton, parathion, phenkapton, phorate, phosalone, phosmet, phostin, phoxim, pirimiphos-methyl, prothidathion, prothoate, pyrimitate, quinalphos, quintiofos, sophamide, sulfotep, thiometon, triazophos, trifenofos, vamidothion; phosphonate acaricides—trichlorfon; phosphoramidothioate acaricides—isocarbophos, methamidophos, propetamphos; phosphorodiamide acaricides—dimefox, mipafox, schradan; organotin acaricides—azocyclotin, cyhexatin, fenbutatin, oxide, phostin; phenylsulfamide acaricides—dichlofluanid; phthalimide acaricides—dialifos, phosmet; pyrazole acaricides—cyenopyrafen, fenpyroximate; phenylpyrazole acaricides—acetoprole, fipronil, vaniliprole; pyrazolecarboxamide acaricides—pyflubumide, tebufenpyrad; pyrethroid ester acaricides—acrinathrin, bifenthrin, brofluthrinate, cyhalothrin, cypermethrin, alpha-cypermethrin, fenpropathrin, fenvalerate, flucythrinate, flumethrin, fluvalinate, tau-fluvalinate, permethrin; pyrethroid ether acaricides—halfenprox; pyrimidinamine acaricides—pyrimidifen; pyrrole acaricides—chlorfenapyr; quaternary ammonium acaricides—sanguinarine; quinoxaline acaricides—chinomethionat, thioquinox; methoxyacrylate strobilurin acaricides—bifujunzhi, fluacrypyrim, flufenoxystrobin, pyriminostrobin; sulfite ester acaricides—aramite, propargite; tetronic acid acaricides—spirodiclofen; tetrazine acaricides, clofentezine, diflovidazin; thiazolidine acaricides—flubenzimine, hexythiazox; thiocarbamate acaricides—fenothiocarb; thiourea acaricides—chloromethiuron, diafenthiuron; unclassified acaricides—acequinocyl, acynonapyr, amidoflumet, arsenous, oxide, clenpirin, closantel, crotamiton, cycloprate, cymiazole, disulfiram, etoxazole, fenazaflor, fenazaquin, fluenetil, mesulfen, MNAF, nifluridide, nikkomycins, pyridaben, sulfiram, sulfluramid, sulfur, thuringiensin, triarathene.

In some embodiments, a miticide can also be selected from abamectin, acephate, acequinocyl, acetamiprid, aldicarb, allethrin, aluminum phosphide, aminocarb, amitraz, azadiractin, azinphos-ethyl, azinphos-methyl, *Bacillus thuringiensis*, bendiocarb, beta-cyfluthrin, bifenazate, bifenthrin, bomyl, buprofezin, calcium cyanide, carbaryl, carbofuran, carbon disulfide, carbon tetrachloride, chlorfenvinphos, chlorobenzilate, chloropicrin, chlorpyrifos, clofentezine, chlorfenapyr, clothianidin, coumaphos, crotoxyphos, crotoxyphos+dichlorvos, cryolite, cyfluthrin, cyromazine, cypermethrin, deet, deltamethrin, demeton, diazinon, dichlofenthion, dichloropropene, dichlorvos, dicofol, dicrotophos, dieldrin, dienochlor, diflubenzuron, dikar (fungicide+miticide), dimethoate, dinocap, dinotefuran, dioxathion, disulfoton, emamectin benzoate, endosulfan, endrin, esfenvalerate, ethion, ethoprop, ethylene dibromide, ethylene dichloride, etoxazole, famphur, fenitrothion, fenoxycarb, fenpropathrin, fenpyroximate, fensulfothion, fenthion, fenvalerate, flonicamid, flucythrinate, fluvalinate, fonofos, formetanate hydrochloride, gamma-cyhalothrin, halofenozide, hexakis, hexythiazox, hydramethylnon, hydrated lime, indoxacarb, imidacloprid, kerosene, kinoprene, lambda-cyhalothrin, lead arsenate, lindane, malathion, mephosfolan, metaldehyde, metam-sodium, methamidophos, methidathion, methiocarb, methomyl, methoprene, methoxychlor, methoxyfenozide, methyl bromide, methyl parathion, mevinphos, mexacarbate, Milky Disease Spores, naled, naphthalene, nicotine sulfate, novaluron, oxamyl, oxydemeton-methyl, oxythioquinox, para-dichlorobenzene, parathion, PCP, permethrin, petroleum oils, phorate, phosalone, phosfolan, phosmet, phosphamidon, phoxim, piperonyl butoxide, pirimicarb, pirimiphos-methyl, profenofos, propargite, propetamphos, propoxur, pymetrozine, pyrethroids—synthetic: see allethrin, permethrin, fenvalerate, resmethrin, pyrethrum, pyridaben, pyriproxyfen, resmethrin, rotenone, s-methoprene, soap, pesticidal, sodium fluoride, spinosad, spiromesifen, sulfotep, sulprofos, temephos, terbufos, tetrachlorvinphos, tetrachlorvinphos+dichlorvos, tetradifon, thiamethoxam, thiodicarb, toxaphene, tralomethrin, trimethacarb, and tebufenozide.

The amount of the nitrogen-stabilizing composition in agricultural compositions containing additional active agents (e.g., pesticides, herbicides, insecticides, fungicides, and/or miticides) can vary. In some embodiments, the amount of nitrogen-stabilizing composition is present at a level of from about 0.05-10% by weight (or from about 0.1%-8% by weight; or from about 0.1%-4% by weight, and most preferably from about 0.2-2% by weight) based upon the total weight of the agricultural composition containing additional active agents taken as 100% by weight.

V. Methods

In some embodiments, the nitrogen-stabilizing compositions and/or formulations are used directly. In other embodiments, the nitrogen-stabilizing compositions are formulated in ways to make their use convenient in the context of productive agriculture. The nitrogen-stabilizing compositions used in these methods include the nitrogen stabilizer and cyclic organic acid anhydride components as described above. The nitrogen-stabilizing compositions can be used in methods such as:

A. Methods of Improving Plant Growth and/or Fertilizing Soil
B. Methods of Inhibiting Nitrification, Urease Decomposition or Ammonia Release or Evolution
C. Methods of Improving Soil Conditions
D. Methods of Improving crop yield
E. Methods of Preparing Nitrogen-Stabilizing Compositions
F. Methods of Preparing Formulations of Nitrogen-Stabilizing Compositions A. Methods for improving plant growth comprise contacting a nitrogen-stabilizing composition or formulation containing a nitrogen-stabilizing composition as disclosed herein with soil. In some embodiments, the nitrogen-stabilizing composition or formulation is applied to the soil prior to emergence of a planted crop. In some embodiments, the nitrogen-stabilizing composition or formulation is applied to the soil adjacent to the plant and/or at the base of the plant and/or in the root zone of the plant.

Methods for improving plant growth can also be achieved by applying a nitrogen-stabilizing composition or formulation containing a nitrogen-stabilizing composition, as disclosed herein, as a seed coating to a seed in the form of a liquid dispersion which upon drying forms a dry residue. In these embodiments, seed coating provides the nitrogen-stabilizing composition in close proximity to the seed when planted so that the nitrogen-stabilizing composition can exert its beneficial effects in the environment where it is most needed. That is, the nitrogen-stabilizing composition provides an environment conducive to enhanced plant growth in the area where the effects can be localized around the desired plant. In the case of seeds, the coating containing the nitrogen-stabilizing composition provides an enhanced opportunity for seed germination, subsequent plant growth, and an increase in plant nutrient availability.

B. Methods for inhibiting/reducing nitrification, urease decomposition, or ammonia release or evolution in an affected area comprises applying a nitrogen-stabilizing composition or formulation containing a nitrogen-stabilizing composition as disclosed herein to the affected area. The affected area may be soil adjacent to a plant, a field, a pasture, a livestock or poultry confinement facility, pet litter, a manure collection zone, an upright wall forming an enclosure, or a roof substantially covering the area, and in such cases the nitrogen-stabilizing composition may be applied directly to the manure in the collection zone. Methods disclosed herein are also directed to inhibiting the conversion of urea into ammonia and/or the conversion of ammonia into nitrate comprising applying a nitrogen-stabilizing composition or formulation containing a nitrogen-stabilizing composition as disclosed herein to the affected area. The nitrogen-stabilizing composition is preferably applied at a level from about 0.005-3 gallons per ton of manure, in the form of an aqueous dispersion having a pH from about 1-5.

C. Methods for improving soil conditions selected from the group consisting of nitrification processes, urease activities, and combinations thereof, comprising the step of applying to soil an effective amount of a described nitrogen-stabilizing composition or formulation thereof. In some embodiments, the nitrogen-stabilizing composition is mixed with a solid, liquid, or gaseous fertilizer, and especially solid fertilizers; in the latter case, the nitrogen-stabilizing composition is applied to the surface of the fertilizer as an aqueous dispersion followed by drying, so that the nitrogen-stabilizing composition is present on the solid fertilizer as a dried residue. The nitrogen-stabilizing composition is generally applied at a level of from about 0.01-10% by weight, based upon the total weight of the nitrogen-stabilizing composition/fertilizer product taken as 100% by weight. Where the fertilizer is an aqueous liquid fertilizer, the nitrogen-stabilizing composition is added thereto with mixing. The nitrogen-stabilizing composition is preferably in aqueous dispersion and has a pH of up to about 3.

D. Methods of improving crop yield comprises applying a nitrogen-stabilizing composition or formulation containing a nitrogen-stabilizing composition as disclosed herein to the affected area. In some embodiments, the affected area may be a field. In some embodiments, the nitrogen-stabilizing composition or formulation is applied to the soil around the plant, adjacent to the plant stem, or sprayed onto various plant parts of the plant. In some embodiments, the plant is a maize plant although it should not be limited thereto. In some embodiments, the nitrogen-stabilizing composition or formulation is applied in combination with a fertilizer. In some embodiments, the fertilizer is a nitrogen-containing fertilizer. In some embodiments, the fertilizer contains urea. In some embodiments, the nitrogen-stabilizing composition or formulation is applied is applied before, after or at the same time of the application of the nitrogen-containing fertilizer. In some embodiments, the crop yield/harvest yield of plants treated with a nitrogen-stabilizing composition as disclosed herein is increased by at least about 10%, about 20%, about 30%, about 40%, about 50%, about 60%, about 70%, about 80%, about 90%, or at least by about 95% compared to untreated plants. In some embodiments, the crop/harvest yield of plants treated with a nitrogen-stabilizing composition as disclosed herein is increased by about 50% to about 100%, from about 60% to about 95%, from about 65% to about 95%, from about 65% to about 90%, from about 65% to about 80%, or from about 70% to about 80% compared to untreated plants. In some embodiments, the nitrogen-stabilizing composition is applied in combination with urea. In some embodiments, the crop/harvest yield of plants treated with a nitrogen-stabilizing composition as disclosed herein in combination with urea is increased by at least about 1%, about 5%, about 8%, about 10%, about 12%, about 14%, about 15%, about 18%, about 20%, about 22%, about 24%, about 25% compared to plants treated with urea. In some embodiments, the crop/harvest yield of plants treated with a nitrogen-stabilizing composition as disclosed herein in combination with urea is increased by about 1% to about 30%, from about 1% to about 25%, from about 5% to about 25%, from about 15% to about 25%, from about 20% to about 25%, from about 5% to about 20%, or from about 5% to about 15% compared to plants treated with urea.

In some embodiments, the number of rows of kernels present on a corn cob from maize plants treated with the disclosed formulation is higher compared to the number of kernels present on a corn cob from untreated maize plants. In some embodiments, the number of rows of kernels present in corn ears from maize plants treated with the nitrogen-stabilizing compositions or formulations as disclosed herein is at least about 10%, about 20%, about 30%, about 40%, about 50%, about 60%, about 70%, or about 80% more compared to the number of rows of kernels present in corn ears of untreated maize plants. In some embodiments, the number of rows of kernels present in corn ears from maize plants treated with the nitrogen-stabilizing compositions or formulations as disclosed herein is about 10% to about 80%, about 20% to 70%, about 30% to about 60%, or about 40% to about 50% higher compared to the number of rows of kernels present in corn ears of untreated maize plants.

In some embodiments, the number of rows of kernels present in corn ears from maize plants treated with the nitrogen-stabilizing composition or formulation as disclosed herein in combination with a nitrogen fertilizer is at least about 10%, about 20%, about 30%, about 40%, about 50%, about 60%, about 70%, or about 80% higher compared to the number of rows of kernels present in form corn ears of maize plants treated with nitrogen fertilizer (i.e., urea). In some embodiments, the number of rows of kernels present in corn ears from maize plants treated with the nitrogen-stabilizing compositions or formulations as disclosed herein is about 10% to about 80%, about 20% to 70%, about 25% to about 60%, about 30% to about 50%, or about 30% to about 40% higher compared to the number of rows of kernels present in form corn ears of maize plants treated with nitrogen fertilizer (i.e., urea).

E. Methods of preparing nitrogen-stabilizing compositions as disclosed herein comprise contacting a nitrogen stabilizer component with an acid anhydride component. The contacting step can be carried out neat or can be carried out in the presence of a solvent. In some embodiments, the contacting step further comprises a non-polar solvent such as, but not limited to, acetonitrile. In some embodiments, the contacting step is carried out at ambient temperature. In some embodiments, the contacting step if carried out at elevated temperatures ranging from about 25° C. to about 150° C., from about 30° C. to about 120° C., from about 40° C. to about 100° C., from about 50° C. to about 90° C., or from about 60° C. to about 80° C. The amount of nitrogen stabilizer component and acid anhydride component can vary. In some embodiments, the nitrogen stabilizer component and the acid anhydride component are present in a molar ratio ranging from about 1:2 to about 2:1.

F. Methods for preparing stabilizing formulations of nitrogen-stabilizing compositions are disclosed herein. In order to prepare the formulations as disclosed herein, the methods require complete solubilization of all components that are present in the formulation. Methods, which included contacting the nitrogen-stabilizing component with an organic acid anhydride component that was a polymer as disclosed herein in the presence of an aprotic solvent, were not successful in rendering the desired formulation, because not all of the components (particularly the polymer) were soluble in the aprotic solvent at room temperature as well as at elevated temperatures. Surprisingly, the desired formulation was only obtained when first, a pre-mix solution of the polymer present at high concentration was prepared and then an aliquot was removed therefrom, which subsequently diluted with additional aprotic solvent and contacted with the nitrogen-stabilizing composition. It was very surprising and unexpected to discover that all of the components of the nitrogen-stabilizing composition were only soluble when the polymer was first prepared as a pre-mix solution before mixing the polymer with the nitrogen-stabilizer component.

Therefore, methods of preparing a formulation as disclosed herein comprises the steps of:

mixing an organic acid anhydride component with a first aprotic solvent to form an organic acid anhydride component pre-mix solution;

removing an aliquot of the organic acid anhydride component pre-mix solution;

diluting the removed aliquot with a second aprotic solvent to render an organic acid anhydride solution;

contacting the organic acid anhydride solution with an amine stabilizer to render a stabilized organic acid anhydride solution; and adding a nitrogen stabilizer component to the stabilized organic acid anhydride solution to yield the desired stabilizing formulation.

In some embodiments, the organic acid anhydride component is a polymer as disclosed herein. In some embodiments, the first aprotic solvent and the second aprotic solvent are the same. In some embodiments, the first aprotic solvent is DMSO. In some embodiments, the mixing step occurs at elevated temperatures (e.g., above room temperature). In some embodiments, the mixing step occurs at temperatures ranging from about 30° C. to about 200° C., from about 40° C. to about 175° C. from about 50° C. to about 150° C., from about 60° C. to about 125° C., from about 70° C. to about 100° C., or from about 75° C. to about 85° C. In some embodiments, the mixing step occurs at room temperature. Note that the organic acid anhydride component solvates slower at room temperature than it does at elevated temperatures. In some embodiments, the amount of the organic acid anhydride component to be mixed ranges from about 5% to about 25% w/w based on the total weight of the organic acid anhydride component pre-mix solution.

In some embodiments, the amount of the aliquot of the organic acid anhydride component pre-mix solution in the removing step ranges from about 25% to about 50% w/w based on the total weight of the organic acid anhydride component pre-mix solution.

In some embodiments, the amount of the second aprotic solvent ranges from about 20% to about 50% w/w based on the total weight of the stabilizing formulation. In some embodiments, the second aprotic solvent is DMSO.

In some embodiments, the amount of amine stabilizer ranges from about 1% to about 20% w/w based on the total weight of the stabilizing formulation. In some embodiments, the amine stabilizer is monoethanolamine.

In some embodiments, the nitrogen stabilizer component is a urease inhibitor and/or nitrification inhibitor. In some embodiments, the nitrogen stabilizer component is DCD. In some embodiments, the nitrogen stabilizer component is NBPT.

In some embodiments, the nitrogen stabilizer component is NBPT and DCD. In such embodiments, the method further comprises that DCD and NBPT are added sequentially to the stabilized organic acid anhydride solution. For example, in some embodiments, DCD is added prior to NBPT to the stabilized organic acid anhydride solution. In some embodiments, the method further comprises cooling the stabilized organic acid anhydride solution after DCD is added and prior to the addition of NBPT. In some embodiments, the stabilized organic acid anhydride solution is cooled about 80° C. or less after DCD is added but before NBPT is added.

Methods disclosed herein are also directed to preparing stabilized formulations of individual components of the nitrogen-stabilizing compositions comprises the steps of:

contacting an amine stabilizer with an aprotic solvent to render a stabilized aprotic solvent; and adding a nitrogen-stabilizer component to the stabilized aprotic solvent to yield a stabilizing formulation.

Methods disclosed herein are also directed to preparing stabilizing formulations containing the organic acid anhydride component as disclosed herein, comprising the steps of:

mixing an organic acid anhydride component with a first aprotic solvent to form an organic acid anhydride component pre-mix solution;

removing an aliquot of the organic acid anhydride component pre-mix solution;

diluting the removed aliquot with a second aprotic solvent to render an organic acid anhydride solution;

contacting the organic acid anhydride solution with an amine stabilizer to render a stabilizing formulation.

In some embodiments, the methods A, B, and C above comprise contacting a desired area with a nitrogen-stabilizing composition at a rate of about 100 g to about 120 g per acre of the nitrogen-stabilizing composition. The nitrogen-stabilizing composition can, in some embodiments, be in solution at an amount of about 0.5 lbs. to about 4 lbs. per U.S. gallon, or from about 1 lb. to about 3 lbs. per U.S. gallon, or about 2 lbs. per U.S. gallon. In some embodiments, the method includes contacting the desired area at a rate of about 0.5 to about 4 qt./Acre, or about 1 to about 2 qt./Acre.

Particular embodiments of the subject matter described herein include:

1. A stabilizing formulation comprising:
   a nitrogen-stabilizing composition comprising:
   a nitrogen stabilizer component, and
   an organic acid anhydride component,
   wherein the nitrogen stabilizer component is a urease inhibitor and/or nitrification inhibitor; and
   a vehicle comprising:
   an aprotic solvent, and
   an amine stabilizer.
2. The stabilizing formulation of embodiment 1, wherein the nitrogen stabilizer component is N-(n-butyl) thiophosphoric triamide (NBPT) and/or dicyanamide (DCD).
3. The stabilizing formulation of embodiment 1 or 2, wherein the organic acid anhydride component is an organic acid anhydride polymer.
4. The stabilizing formulation of any above embodiment, wherein the organic acid anhydride polymer is a copolymer containing at least two different repeat units, including one of type B repeat unit and one of type C repeat unit.
5. The stabilizing formulation of embodiment 4, wherein the copolymer is a random copolymer.
6. The stabilizing formulation of embodiment 4 or 5, wherein the type B repeat unit is derived from (un) substituted monomers of maleic anhydride, itaconic anhydride, or a combination thereof.
7. The stabilizing formulation of any one of embodiments 4-6, wherein the type B repeat unit is derived from (un)substituted monomers of maleic anhydride.
8. The stabilizing formulation of any one of embodiments 4-7, wherein at least about 50 mole % of the repeat units of the organic acid anhydride polymer are type B repeat units.
9. The stabilizing formulation of any one of embodiments 4-8, wherein the organic acid anhydride polymer contains a type C repeat unit that is derived from (un) substituted alkene(s).
10. The stabilizing formulation of embodiment 9, wherein the alkene is selected from ethylene, propylene, butylene, isobutylene, styrene, methyl vinyl ether and a combination thereof.
11. The stabilizing formulation of any one of claims 3-10, wherein the organic acid anhydride polymer has a structure according to formula:

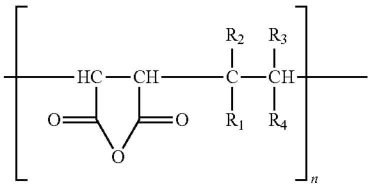

wherein $R_1$ $R_2$, $R_3$ and $R_4$ are independently selected from —H, —COOH, —COOR, —OCOH, —OCOR, —OR, —CN, —$SO_2R$, —$SO_3R$, —COR, —$CONH_2$, —CONHR, —$CONR_2$, —CHO, $NO_2$, halogen-alkyl, -cycloalkyl, -aryl, -alkaryl, or aralkyl, wherein R is a (un)substituted C1-C8 alkyl group, a (un)substituted C2-C8 alkenyl group, a (un)substituted aryl group, a (un)substituted heteroaryl group; and n is an integer greater than 2.

12. The stabilizing formulation of any above embodiments, wherein the aprotic solvent is selected from dichloromethane, dimethyl acetamide, dimethyl formamide, dimethyl sulfoxide (DMSO), ethyl acetate, acetone, acetonitrile, hexamethylphosphoramide, dimethyl sulfone, sulfolane, 1,3-dimethyl-2-imidazoidinone, 1,3-dimethyl-3,4,5,6-tetrahydro-2(1H)-pyrimidone, methyl acetate, ethyl lactate, N-methylpyrrolidone, tetrahydrofuran, and propylene carbonate.
13. The stabilizing formulation of any above embodiment, wherein the aprotic solvent is dimethyl sulfoxide (DMSO).
14. The stabilizing formulation of any above embodiment, wherein the amine stabilizer is selected from 1,2-diaminocyclohexane (DCH), Bis(hexamethylene)triamine (BHT), monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol.
15. The stabilizing formulation of any above embodiment, wherein the amine stabilizer is monoethanolamine.
16. The stabilizing formulation of any above embodiment, wherein the nitrogen-stabilizing composition is present in an amount of from about 5% to about 50% w/w based on the total weight of the stabilizing formulation.
17. The stabilizing formulation of any above embodiment, wherein the aprotic solvent is present in an amount of from about 50% to about 75% w/w based on the total weight of the stabilizing formulation.
18. The stabilizing formulation of any above embodiment, wherein the amine stabilizer is present in an amount of from about 3% to about 8% w/w based on the total weight of the stabilizing formulation.
19. The stabilizing formulation of any above embodiment, wherein the nitrogen-stabilizer component is present in an amount of from about 5% to about 50% w/w based on the total weight of the stabilizing formulation.
20. The stabilizing formulation of any above embodiment, wherein the nitrogen-stabilizer component comprises a urease inhibitor that is present in an amount of from about 5% to about 15% w/w based on the total weight of the stabilizing formulation and a nitrification inhibitor that is present in an amount of from about 5% to about 20% w/w based on the total weight of the stabilizing formulation.
21. The stabilizing formulation of any above embodiment, wherein the nitrogen-stabilizer component comprises a urease inhibitor that is present in an amount of from about 5% to about 15% w/w, a nitrification inhibitor that is present in an amount of from about 5% to about 20% w/w, an aprotic solvent that is present in an amount of from about 50% to about 75%, and an amine stabilizer that is present in an amount of from about 3% to about 8% w/w, wherein all weights are based on the total weight of the stabilizing formulation.

22. The stabilizing formulation of embodiment 20 or 21, wherein the urease inhibitor is DCD and the nitrification inhibitor is NBPT.
23. The stabilizing formulation of any one of embodiments 20-22, wherein the aprotic solvent is DMSO
24. The stabilizing formulation of any one of embodiments 20-23, wherein the amine stabilizer is monoethanolamine.
25. An agricultural composition comprising the stabilizing formulation of any one of the preceding embodiments and a fertilizer.
26. The agricultural composition of embodiment 25, wherein the fertilizer is a urea-containing fertilizer.
27. The agricultural composition of embodiment 25 or 26, wherein the urea-containing fertilizer is manure.
28. The agricultural composition of any one of embodiments 25-27, wherein the urea-containing fertilizer is present at a level from about 1-12 moles/L.
29. The agricultural composition of any one of embodiments 25-28, wherein the stabilizing formulation is applied to the surface of the fertilizer in the form of an aqueous dispersion.
30. A method of inhibiting soil-borne urease enzyme comprising the step of applying to the soil a stabilizing formulation of any one of the preceding embodiments, said formulation being present in a quantity sufficient to inhibit the decomposition of urea by the action of soil-borne urease enzyme.
31. A method of fertilizing soil comprising applying to the soil a stabilizing formulation of any one of embodiments 1-24, or an agricultural composition of any one of embodiments 25-29.
32. A method for preparing a stabilizing formulation of any one of embodiments 1-24, comprising the steps of:
    mixing an organic acid anhydride component with a first aprotic solvent to form an organic acid anhydride component pre-mix solution;
    removing an aliquot of the organic acid anhydride component pre-mix solution;
    diluting the removed aliquot with a second aprotic solvent to render an organic acid anhydride solution;
    contacting the organic acid anhydride solution with an amine stabilizer to render a stabilized organic acid anhydride solution; and
    adding a nitrogen stabilizer component to the stabilized organic acid anhydride solution to yield the desired stabilizing formulation.
33. The method of embodiment 32, wherein the first and second aprotic solvents are DMSO.
34. The method of embodiment 32, wherein the mixing step occurs at a temperature ranging from about 70° C. to about 100° C.
35. The method of any one of embodiments 32-34, wherein the amount of the organic acid anhydride component present ranges from about 5% to about 25% w/w based on the total weight of the organic acid anhydride component pre-mix solution.
36. The method of any one of embodiments 32-35, wherein the amount of the aliquot of the organic acid anhydride component pre-mix solution ranges from about 25% to about 50% w/w based on the total weight of the organic acid anhydride component pre-mix solution.
37. The method of any one of embodiments 32-36, wherein the amount of amine stabilizer ranges from about 1 to about 20% w/w based on the total weight of the stabilizing formulation.
38. The method of any one of embodiments 32-37, wherein the nitrogen stabilizer component comprises a urease inhibitor and a nitrification inhibitor.
39. The method of embodiment 38, wherein adding the nitrogen stabilizer component comprises sequential addition of the urease inhibitor and the nitrification inhibitor.
40. The method of embodiment 39, wherein the nitrification inhibitor is added prior to the urease inhibitor.
41. The method of embodiment 40, wherein the adding step further comprises cooling the stabilized organic acid anhydride solution after adding the nitrification inhibitor and prior to adding the urease inhibitor.

EXAMPLES

Example 1: Preparation of Pre-Mix Polymer Solution

A Pre-Mix Polymer solution was prepared containing 80% w/w dimethyl sulfoxide (DMSO) (heated to 175° F. (79° C.)) and 20% w/w organic acid anhydride polymer 1. First, DMSO was heated to 175° F. (79° C.) in a stainless steel mixing vessel. The premix solution was mixed until all polymer completely dissolved and a clear solution was observed.

This Pre-Mix Polymer solution can optionally be diluted down with additional DMSO solvent depending on the % polymer formula being made.

Example 2: Preparation of 5-20-5 (polymer 1-DCD-NBPT) Formula 25.0% w/w of the Pre-Mix Polymer solution in Example 1 was transferred into a Stainless-steel heated reactor and the tank was heated to 175° F. (79° C.). While heating, an additional 45% w/w more DMSO was added to the solution. Next, 5% w/w monoethanolamine (MEA) was added. After the addition a color change was detected to a darker yellow solution. The reaction mixture continued mixing for an additional 30 minutes.

20% w/w DCD was slowly added into the heated blend tank. Reaction mixture continued mixing for 60 minutes and samples were analyzed to ensure that the DCD has dissolved completely. Once the DCD has dissolved, the solution was allowed to cool down to 100° F.

Lastly, 5% w/w NBPT was added to the solution which is at 100° F. (38° C.) or less. Product turned green with mixing. Continued mixing until finished product was obtained as a clear yellow semi viscous material.

The above procedure was followed to prepare formulation shown in Tables 1-3.

TABLE 1

| DCD-NBPT coating 10-10-10 (polymer 1-DCD-NBPT) | | | | | | |
|---|---|---|---|---|---|---|
| # | RAW MATERIALS | GALS | LBS | GMS | WT % | MIXING INSTRUCTIONS |
| 1 | DMSO | | 194.66 | | 20 | 175 F. |
| 2 | Polymer 1 as 20% solution | | 486.65 | | 50 | |
| 3 | MEA | | 97.33 | | 10 | |
| 4 | DCD | | 97.33 | | 10 | Heat |
| 6 | | | 0.00 | | | Let Cool |
| 8 | NBPT | | 97.33 | | 10 | |
| 15 | | | 0.00 | | | Top and Bottom Quality Control Samples Required |
| | | | | | 100.00 | |

TABLE 2

| DCD-NBPT Coating 5-5-15 (polymer 1-DCD-NBPT) | | | | | | |
|---|---|---|---|---|---|---|
| # | RAW MATERIALS | GALS | LBS | GMS | WT % | MIXING INSTRUCTIONS |
| 1 | DMSO | 140.0 | 473.75 | | 50 | 160 F. |
| 2 | Polymer 1 as 20% solution | 10.00 | 236.87 | | 25 | |
| 3 | MEA | 10.00 | 47.37 | | 5 | |
| 4 | DCD | 10.00 | 47.37 | | 5 | Heat |
| 6 | | | 0.00 | | | Let Cool |
| 8 | NBPT | 30.00 | 142.12 | | 15.000 | |
| 14 | | 200.00 | | | | |
| 15 | | | | | | Top and Bottom Quality Control Samples Required |
| | | | | | 100.00 | |

TABLE 3

| DCD-NBPT Coating 5-20-5 (polymer 1-DCD-NBPT) | | | | | | |
|---|---|---|---|---|---|---|
| # | RAW MATERIALS | GALS | LBS | GMS | WT % | MIXING INSTRUCTIONS |
| 1 | DMSO | 65.0 | 431.60 | | 45 | 175 F. |
| 2 | Polymer 1 as 20% solution | 5.00 | 239.78 | | 25 | |
| 3 | MEA | 5.00 | 47.96 | | 5 | |
| 4 | DCD | 20.00 | 191.82 | | 20 | Heat |
| 6 | | | 0.00 | | | Let Cool |
| 8 | NBPT | 5.00 | 47.96 | | 5 | |
| 13 | | | 0.00 | 0.00 | | Must be filtered. Minimum 5 microns |
| | | | | | 100 | |

TABLE 4

| Summary of solubility observations of various formulations | | | | | | | |
|---|---|---|---|---|---|---|---|
| Name* | Polymer 2 | Polymer 3 | Polymer 4 | Polymer 5 | DCD | NBPT | Conclusion** |
| 5-5-5 DCD-NBPT | 5.00 | | | | 5.00 | 5.00 | Fail |
| 5-5-5 DCD-NBPT (2) | 5.00 | | | | 5.00 | 5.00 | Pass |
| 5-5-5 DCD-NBPT (3) | 5.00 | | | | 5.00 | 5.00 | Fail |

TABLE 4-continued

Summary of solubility observations of various formulations

| Name* | Polymer 2 | Polymer 3 | Polymer 4 | Polymer 5 | DCD | NBPT | Conclusion** |
|---|---|---|---|---|---|---|---|
| 7.5-7.5-7.5 | 7.50 | | | | 7.50 | 7.50 | Pass |
| 10-7.5-10 | 10.00 | | | | 7.50 | 10.00 | Pass |
| 7.5-10-7.5 | 7.50 | | | | 10.00 | 7.50 | Pass |
| 10-10-7.5 | 10.00 | | | | 10.00 | 7.50 | Pass |
| 10-7.5-12.5 | 10.00 | | | | 7.50 | 12.50 | Fail |
| 8.0-10-15 | 8.00 | | | | 10.00 | 15.00 | Fail |
| 8.0-5-20 | 8.00 | | | | 5.00 | 20.00 | Fail |
| 6.0-7.5-20.0 | 6.00 | | | | 7.50 | 20.00 | Fail |
| 5-5-15 DCD-NBPT | 5.00 | | | | 5.00 | 15.00 | Fail |
| 5-5-15 DCD-NBPT (2) | 5.00 | | | | 5.00 | 15.00 | Fail |
| 5-5-15 DCD-NBPT(3) | | | | 5.00 | 5.00 | 15.00 | Pass |
| 5-5-15 DCD-NBPT (4) | | 5.00 | | | 5.00 | 15.00 | Fail |
| 5-5-15 DCD-NBPT (6) | | | 5.00 | | 5.00 | 15.00 | Fail |
| 10-10-10 DCD-NBPT | 10.00 | | | | 10.00 | 10.00 | Fail |
| 10-10-10 DCD-NBPT (2) | 10.00 | | | | 10.00 | 10.00 | Fail |
| 10-10-10 DCD-NBPT (3) | 10.00 | | | | 10.00 | 10.00 | Fail |
| 10-10-10 DCD-NBPT (4) | 10.00 | | | | 10.00 | 10.00 | Pass |
| 10-10-10 DCD-NBPT (5) | | | | 10.00 | 10.00 | 10.00 | Pass |
| 10-10-10 DCD-NBPT (6) | | | 10.00 | | 10.00 | 10.00 | Fail |
| 10-10-10 DCD-NBPT (7) | | 10.00 | | | 10.00 | 10.00 | Fail |
| 5-8.5-8.5 DCD-NBPT | 5.00 | | | | 8.50 | 8.50o | Fail |
| 5-15-10.0 | | | | 5.00 | 15.00 | 10.00 | Pass |
| 7-14-7.0 | | | | 7.00 | 14.00 | 7.00 | Fail |
| 5.0-20-5.0 | | | | 5.00 | 20.00 | 5.00 | Pass |

*relative amounts of polymer, DCD, and NBPT are described as % polymer-% DCD-% NBPT.

**PASS indicates formulations wherein all components are completely soluble and the solution if clear. FAIL stands for formulation wherein all components are not fully soluble and the solution is cloudy or a precipitate is observed.

Example 3: Preparation of 5-20-5 (Polymer 1-DCD-NBPT) Formula without a Pre-Mix Polymer Solution 65% w/w DMSO was heated to 175° F. (79° C.) in a stainless steel reactor. 5% w/w dry polymer was slowly sifted into solution. After completion of the addition, the reaction mixture was mixed until all polymer has completely dissolved and the solution turn into a straw-colored, clear appearance. 5% w/w monoethanolamine was added and the resulting solution turns into a darker color yellow. The reaction mixture continues stirring for an additional 30 minutes.

20% w/w DCD was slowly added into heated blend tank. After completion of addition, the reaction mixture was mixed for 60 minutes and sample were removed and tested to ensure that all of the DCD has totally dissolved. Once the DCD has dissolved, the solution was allowed to slowly cool down to 100° F. (38° C.).

5% w/w NBPT was added to the cooled solution which is at 100° F. (38° C.) or less. Product turned green with mixing, which was continued until eventually a yellow colored finished product was produced.

Example 4: Field Study of Formula 5-5-15

In addition, a field study was carried out using Formula 5-5-15. The results of this field study are shown in FIG. 1 where a corn field was treated with no urea, a urea-containing fertilizer, and a urea-containing fertilizer with a formulation as disclosed herein (having 15% NBPT, 5% DCD, and 5% organic acid anhydride polymer 6 w/w based on the total weight of the formulation). The application rate for the 15-5-5 formulation was 2 L of formulation per ton of urea. FIG. 1 shows that the corn treated with the urea-containing fertilizer and the formulation 5-5-15 produced the best corn ears with the most corn grains.

Example 5: Field Study

A field study was carried out of an area under no-till system that was cultivated with rainfed corn (i.e., without irrigation). The corn cultured was a corn hybrid AG 8088 VT PRO (High yield) with a Standak Top of 100 mL/ha and a plant density of 77,000 plants/ha. The following three formulations were applied at three different rates (1, 2, and 3 L/$m^3$) to a field:

- Trident Formulation (10-10-10; % polymer-% DCD-% NBPT)
- Trident V Formulation (5-5-15; % polymer-% DCD-% NBPT)
- Trident N Formulation (5-20-5; % polymer-% DCD-% NBPT)

As a control, plants were only treated with the nitrogen fertilizer (e.g., UAN with 30%-45% N) or were left untreated.

The nitrogen fertilizer was applied with 135 kg/ha of N, which corresponds to a dose of 75N/bu for 10.8 ton/ha of maize. In addition a typical herbicide, fungicide and insecticide program was adopted to remove all study variability due to weeds, diseases or insects throughout the study period;

The activity of nitrate reductase enzyme at V2-V3 and flowering (first fully developed leaf, three plants per plot) was measured. In addition, soil collection was performed for the determination of N—$NO_3$ and N—$NH_4$ up to 30 days after the application of the cover. This methodology was adapted by Cataldo et al (1975) and Kemper; Zewers (1986). Soil Fertility Center (CEFERT). Growth analysis was performed on dry plant mass every 30 days. Harvesting was performed at physiological maturity. The plants of the three central lines of each plot was harvested excluding 1.0 meter at each end. The rows were measured and the number of plants and ears per row harvested were counted. After harvesting, manual threshing was performed and the 100 grain mass was determined as well as the yield of the crop. Harvest results were estimated for kg/ha and bu/acre.

The following results were obtained:

TABLE 5

Results obtained from field study

| Treatments | Harvest # acre | MSFolhas[1] g plant−1 | MSCaule[2] g plant−1 | MSEspiga[3] g plant−1 | MSTotal[4] g plant−1 | 1 $NO_3$[5] mg kg−1 | 1 NH4[6] mg kg−1 | 2 NO3[5] mg kg−1 | 2 NH4[6] mg kg−1 | 1 ANR[7] | 2 ANR[7] | N Folha[8] dag kg−1 | N Grão kg ha−1 |
|---|---|---|---|---|---|---|---|---|---|---|---|---|---|
| Untreat N | 4638d | 77.33 | 114.68 | 141.07 | 333.08 | 29.75 | 26.95 | 21.13 | 18.33 | 111.18 | 50.35 | 1.83 | 73.63 |
| Urea N | 7261c | 80.28 | 148.04 | 191.75 | 420.06 | 34.16 | 31.97 | 27.07 | 25.93 | 137.51 | 74.82 | 2.24 | 115.04 |
| P1[a] | 7657c | 89.21 | 158.93 | 203.23 | 451.37 | 38.12 | 43.65 | 30.33 | 36.40 | 127.11 | 82.41 | 3.19 | 129.36 |
| P2[b] | 7710c | 107.31 | 174.10 | 235.80 | 517.21 | 37.52 | 71.23 | 26.16 | 46.73 | 161.98 | 120.93 | 2.97 | 126.15 |
| P3[c] | 9012a | 76.06 | 150.92 | 221.62 | 448.59 | 33.04 | 57.04 | 39.87 | 66.60 | 142.32 | 71.49 | 3.06 | 116.66 |
| P4[d] | 8271b | 88.98 | 156.09 | 215.08 | 460.15 | 33.04 | 23.01 | 39.71 | 58.64 | 131.58 | 80.41 | 3.11 | 135.18 |
| P5[e] | 8782a | 111.70 | 155.25 | 235.65 | 502.60 | 41.44 | 56.41 | 29.40 | 60.20 | 171.73 | 80.35 | 3.04 | 134.46 |
| P6[f] | 7831c | 80.40 | 164.88 | 234.30 | 479.58 | 33.04 | 49.21 | 35.80 | 40.83 | 148.78 | 73.27 | 3.00 | 123.22 |
| P7[g] | 8853a | 83.13 | 156.47 | 198.90 | 438.49 | 35.84 | 56.62 | 41.60 | 62.93 | 150.21 | 81.69 | 2.90 | 135.09 |
| P8[h] | 8323b | 94.74 | 157.66 | 233.45 | 485.85 | 31.35 | 48.63 | 31.80 | 48.87 | 160.59 | 157.24 | 3.08 | 127.89 |
| P9[i] | 7955c | 74.43 | 178.71 | 182.57 | 435.71 | 34.16 | 51.97 | 28.73 | 45.93 | 145.84 | 91.48 | 3.24 | 140.02 |

[a]Trident combined with UAN fertilizer (30%-45%N) applied with rate 1 L/$m^3$;
[b]Trident combined with UAN fertilizer (30%-45%N) applied with rate 2 L/$m^3$;
[c]Trident combined with UAN fertilizer (30%N) applied with rate 3 L/$m^3$;
[d]Trident V combined with UAN fertilizer (30%-45%N) applied with rate 1 L/$m^3$;
[e]Trident V combined with UAN fertilizer (30%-45%N) applied with rate 2 L/$m^3$;
[f]Trident V combined with UAN fertilizer (30%-45%N) applied with rate 3 L/$m^3$;
[g]Trident N combined with UAN fertilizer (30%-45%N) applied with rate 1 L/$m^3$;
[h]Trident N combined with UAN fertilizer (30%-45%N) applied with rate 2 L/$m^3$;
[i]Trident N combined with UAN fertilizer (30%-45%N) applied with rate 3 L/$m^3$; Anava: f, 0.05; CV %: 17.92%; Scott knott <0.1;
[1]Production of dry mass of corn plants: leaves;
[2]Production of dry mass of corn plants: corn plant stems; 3;
[4]Production of total dry mass of corn plants;
[5]$NO_3$ values in the soil of first and second collection within 30 days;
[6]$NH_4$ values in the soil of first and second collection within 30 days;
[7]activity of the enzyme nitrate reductase in the leaves;
[8]leaf nitrogen content.

Figure 2:
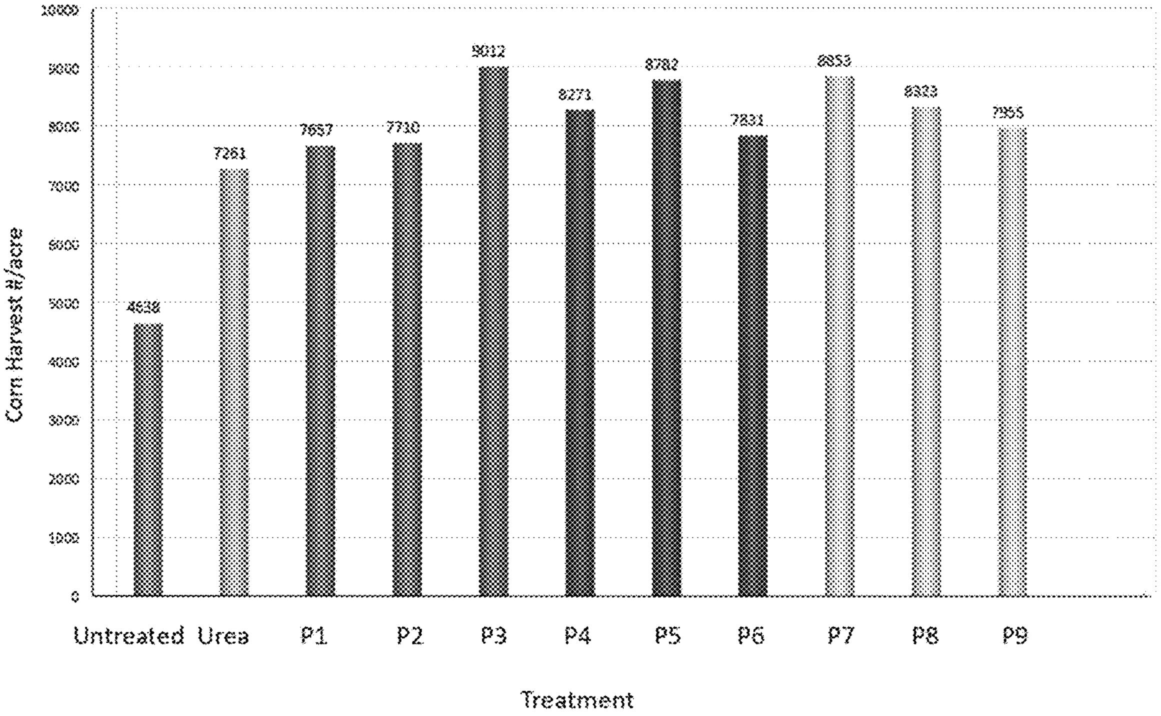
FIG. 2 is a bar graph showing harvest results of the field study where nitrogen fertilization in combination with the disclosed formulations were employed for treating corn plants grown under no-tillage. None different treatments (P1-P9) were carried out and compared to untreated plants or plants treated with nitrogen fertilizer urea.
Figure 3:
FIG. 3 is a picture showing a corn cob untreated on the left and a corn cob treated with a nitrogen fertilizer urea (135 kg/ha of N) on the right. The untreated con shows that an inadequate/insufficient supply of N results in malformation (miscarriage) of the grains while the treated corn cob exhibits an increased amount of kernels.
Figure 4:
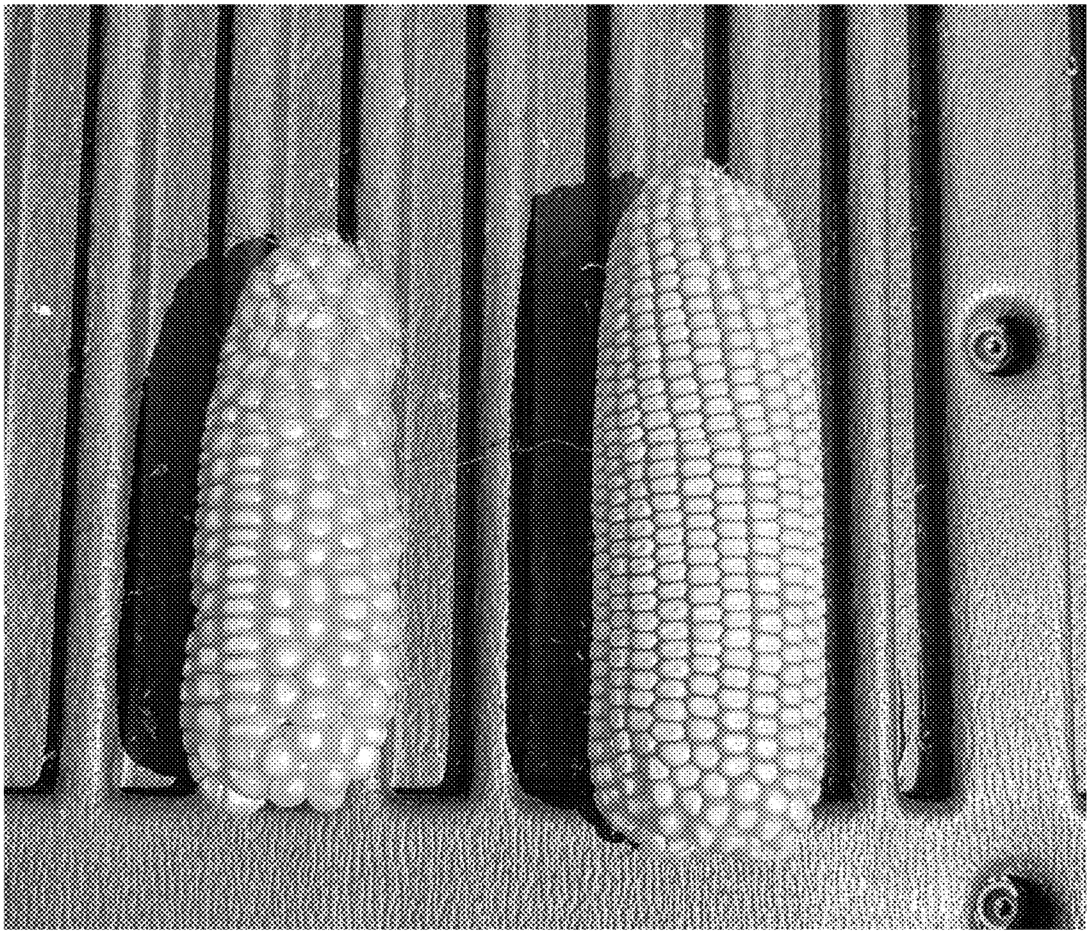
FIG. 4 is a picture showing a corn cob untreated on the left and a corn cob treated with a formulation as disclosed herein in combination with nitrogen fertilizer urea (135 kg/ha of N) on the right. The untreated corn shows that an inadequate/insufficient supply of N results in malformation (miscarriage) of the grains while the treated corn cob shows that an adequate supply of N throughout the growing cycle maintains the protein level in the plants, which is responsible for the formation and filling of the grains.
Figure 5:
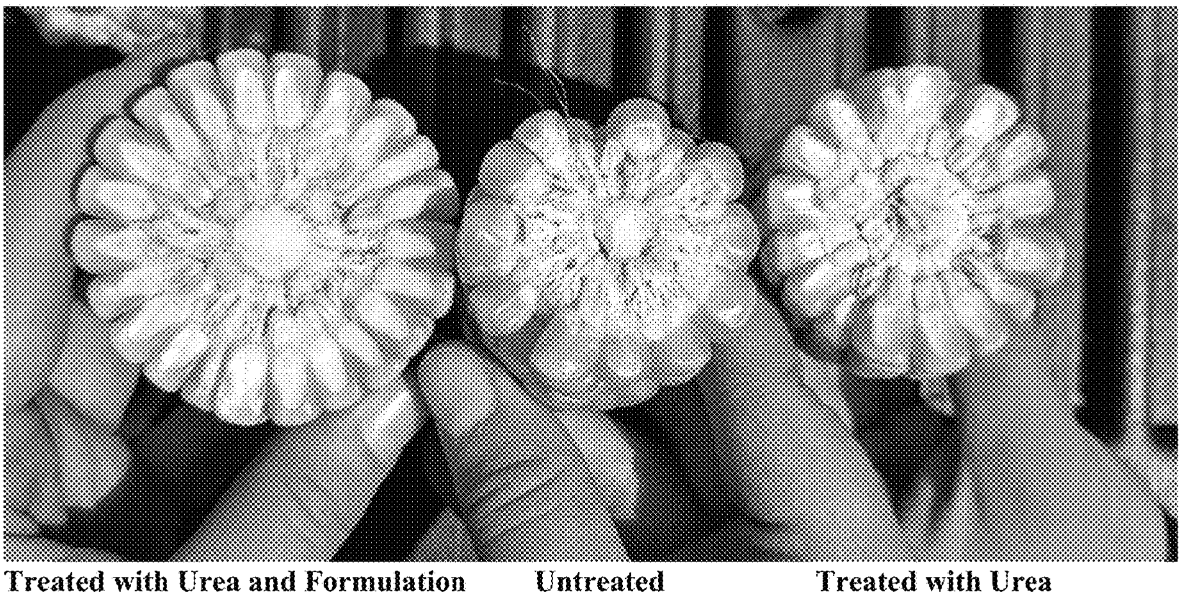
FIG. 5 is a picture showing a corn cob treated with nitrogen fertilizer urea in combination with a formulation (P) as disclosed herein (see left corn cob); an untreated corn cob (see middle corn cob); and a corn cob treated with nitrogen fertilizer urea (see right corn cob). The corn cob treated with a formulation as disclosed herein in combination with nitrogen fertilizer urea exhibited the most rows of corn on the cob.
Figure 6:
FIG. 6 is a picture showing a corn cob treated with nitrogen fertilizer urea in combination with a formulation (P) as disclosed herein (see left corn cob) and a corn cob treated with nitrogen fertilizer urea (see right corn cob). The corn cob treated with a formulation as disclosed herein in combination with nitrogen fertilizer urea exhibited the most rows of corn on the cob.

The harvest results are further shown in FIG. 2, which show an increase in crop yield of at least 50% compared to untreated plants and an increase of crop yield of at least 5% compared to plants treated with UAN. In addition, FIG. 3 shows that the corn ear obtained from maize plants that were treated with urea (@135 kg/ha of N) exhibited more grains of corn compared to ears that were untreated. FIG. 4 shows that corn ears treated with the disclosed formulations in combination with a nitrogen fertilizer exhibited an increased amount of corn rows present in the corn ear compared to corn ears that were left untreated. This is further illustrated in FIG. 5, which compares corn cobs of all three treatments and FIG. 6, which compares corn ears treated with the formulations as disclosed herein combined with nitrogen fertilizer and untreated.

Example 6: Field Study in Various US Locations of the Corn Belt

A field study was carried out in various US locations that are generally referred to as the corn belt of the United States in order to evaluate the formulations as disclosed herein in combination with nitrogen fertilizers on the growth and harvest of corn under various soil and climate conditions.

TABLE 6

Summary of corn yield obtained for each treatment in various locations
Yield, bu/ac

| Site | unfertilized control | fertilized untreated control | Trident | Trident V | Trident N | NCG* |
|---|---|---|---|---|---|---|
| | Treatment | | | | | |
| C Illinios | 129.7 | 197.2 | 210.7 | 207.3 | 204.6 | 199.4 |
| S Illinios | 94.9 | 110.4 | 119.5 | 124.9 | 119.2 | 115.6 |
| C Indiana | 113 | 193.4 | 194.8 | 198.1 | 194.1 | 209.3 |
| N Indiana | 217.4 | 213.1 | 211.5 | 217.6 | 221.8 | 208.4 |
| W Iowa | 154.8 | 243.7 | 226.3 | 241.4 | 237.5 | 240.1 |
| C Iowa | 133.5 | 142.9 | 151.1 | 168.3 | 177.9 | 172.2 |
| Michigan | 97.5 | 160 | 159.9 | 138.5 | 170.1 | 155 |
| Minnesota | 164.2 | 170.4 | 174.8 | 173.2 | 175.6 | 174.4 |
| C Nebraska | 124.3 | 222.2 | 219.3 | 229.8 | 225.6 | 222 |
| NE Nebraska | 104 | 161.1 | 182.2 | 172.8 | 175.1 | 176 |
| N Ohio | 219 | 234.6 | 233.8 | 243.8 | 237.9 | 232.6 |
| C Ohio | 113.9 | 195.4 | 206.5 | 208.9 | 212.4 | 201.6 |
| South Dakota | 190.7 | 224.5 | 225.4 | 221.2 | 223 | 226.2 |
| Tennessee | 116.5 | 141.3 | 144.2 | 141.6 | 144.6 | 141.6 |
| SE Wisconsin | 138.7 | 201.9 | 218.7 | 222.5 | 229.9 | 217.7 |
| SE Wisconsin | 112.7 | 174.9 | 207.5 | 215 | 202.1 | 208.8 |
| Average | 139 | 187 | 193 | 195 | 197 | 194 |

*5-25-0 (% polymer 7-% DCD-% NMPT) [please confirm]

Numerous of these locations exhibited an increase of yield over control (i.e., plants were treated only with nitrogen fertilizer).

TABLE 7

Summary of increase in yield over control in each location
Percent change over fertilized untreated control
Treatment

| Site | UFC | Trident Avg | Trident | Trident V | Trident N | NCG |
|---|---|---|---|---|---|---|
| C Illinios | | 5.2 | 6.8 | 5.1 | 3.8 | 1.1 |
| S Illinios | | 9.8 | 8.2 | 13.1 | 8.0 | 4.7 |
| C Indiana | | 1.2 | 0.7 | 2.4 | 0.4 | 8.2 |
| N Indiana | | 1.8 | −0.8 | 2.1 | 4.1 | −2.2 |
| W Iowa | | −3.5 | −7.1 | −0.9 | −2.5 | −1.5 |
| C Iowa | | 16.0 | 5.7 | 17.8 | 24.5 | 20.5 |
| Michigan | | −2.4 | −0.1 | −13.4 | 6.3 | −3.1 |
| Minnesota | | 2.4 | 2.6 | 1.6 | 3.1 | 2.3 |
| C Nebraska | | 1.2 | −1.3 | 3.4 | 1.5 | −0.1 |
| NE Nebraska | | 9.7 | 13.1 | 7.3 | 8.7 | 9.2 |
| N Ohio | | 1.7 | −0.3 | 3.9 | 1.4 | −0.9 |
| C Ohio | | 7.1 | 5.7 | 6.9 | 8.7 | 3.2 |
| South Dakota | | −0.6 | 0.4 | −1.5 | −0.7 | 0.8 |
| Tennessee | | 1.5 | 2.1 | 0.2 | 2.3 | 0.2 |
| SE Wisconsin | | 10.8 | 8.3 | 10.2 | 13.9 | 7.8 |
| SE Wisconsin | | 19.0 | 18.6 | 22.9 | 15.6 | 19.4 |
| Average | | 5.1 | 3.9 | 5.1 | 6.2 | 4.4 |

Furthermore, it was noted that the amount of nitrogen fertilizer that was applied to each field in the various US locations of the corn belt region was significantly less that the University Recommendations in each location (see Table 8). Not to be bound by theory, but it is believed that due to the combination of DCD (nitrification inhibitor) and NBPT (urease inhibitor) in the disclosed formulation the conversion of urea present in the nitrogen fertilizer is minimized and so is subsequently the leaching of nitrites/nitrates and/or volatilization of ammonia. Furthermore, the presence of the polymer in the formulation promotes the availability of nutrients to the plants. Thus, the amount of nitrogen fertilizer employed with the formulations disclosed herein is at least 60% less than the recommended amount.

TABLE 8

Comparison of the nitrogen rate used in combination with the disclosed formulation vs. recommended.

| | Nitrogen Rate Used in Trials, lbs N/ac | University Recommendation, lbs N/ac | % of Rec Rate |
|---|---|---|---|
| C Illinios | 125 | 180 | 69% |
| S Illinios | 125 | 195 | 64% |
| C Indiana | 125 | 186 | 67% |
| N Indiana | 125 | 205 | 61% |
| W Iowa | 125 | 140 | 89% |
| C Iowa | 125 | 186 | 67% |
| Michigan | 125 | 151 | 83% |
| Minnesota | 125 | 131 | 95% |

TABLE 8-continued

Comparison of the nitrogen rate used in combination with the disclosed formulation vs. recommended.

| | Nitrogen Rate Used in Trials, lbs N/ac | University Recommendation, lbs N/ac | % of Rec Rate |
|---|---|---|---|
| C Nebraska | 125 | 197 | 63% |
| NE Nebraska | 125 | 154 | 81% |
| N Ohio | 125 | 180 | 69% |
| C Ohio | 125 | 180 | 69% |
| South Dakota | 125 | 160 | 78% |
| Tennessee | 125 | 186 | 67% |
| SE Wisconsin | 125 | 121 | 103% |
| SE Wisconsin | 125 | 121 | 103% |
| | | Average | 77% |

That which is claimed is:

1. A stabilizing formulation comprising:

a nitrogen-stabilizing composition comprising:

a nitrogen stabilizer component, wherein the nitrogen stabilizer component is a urease inhibitor and/or nitrification inhibitor; and an organic acid anhydride component, wherein the organic acid anhydride component is an organic acid anhydride polymer containing at least two different repeat units, including one of type B repeat unit and one of type C repeat unit, wherein the type B repeat unit is derived from substituted or unsubstituted monomers of maleic anhydride, itaconic anhydride, or a combination thereof; and the type C repeat unit is derived from substituted or unsubstituted monomers of alkenes according to formula V:

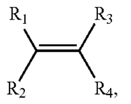

wherein $R_1$, $R_2$, $R_3$, and $R_4$ are independently selected from —H, —CN, —$SO_2R$, —$SO_3R$, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted alkyl group; and a vehicle comprising;

an aprotic solvent, and an amine stabilizer.

2. The stabilizing formulation of claim 1, wherein the nitrogen stabilizer component is N-(n-butyl) thiophosphoric triamide (NBPT) and/or dicyanamide (DCD).

3. The stabilizing formulation of claim 1, wherein at least about 50 mole % of the repeat units of the organic acid anhydride polymer are type B repeat units.

4. The stabilizing formulation of claim 1, wherein the monomers of alkene are selected from ethylene, propylene, butylene, isobutylene, styrene, methyl vinyl ether and a combination thereof.

5. The stabilizing formulation of claim 1, wherein the organic acid anhydride polymer has a structure according to formula:

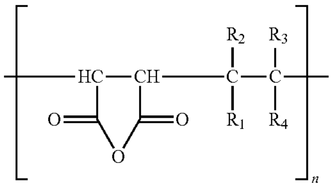

wherein $R_1$ $R_2$, $R_3$ and $R_4$ are independently selected from —H, —CN, —$SO_2R$, —$SO_3R$, —$CONH_2$, —CONHR, —$CONR_2$, —CHO, $NO_2$, halogen-alkyl, -cycloalkyl, -aryl, -alkaryl, or aralkyl, wherein R is a substituted or unsubstituted $C_1$-$C_8$ alkyl group, a substituted or unsubstituted $C_2$-$C_8$ alkenyl group, a substituted or unsubstituted aryl group, a substituted or unsubstituted heteroaryl group; and n is an integer greater than 2.

6. The stabilizing formulation of claim 1, wherein the aprotic solvent is selected from dichloromethane, dimethyl acetamide, dimethyl formamide, dimethyl sulfoxide (DMSO), ethyl acetate, acetone, acetonitrile, hexamethylphosphoramide, dimethyl sulfone, sulfolane, 1,3-dimethyl-2-imidazoidinone, 1,3-dimethyl-3,4,5,6-tetrahydro-2 (1H)-pyrimidone, methyl acetate, ethyl lactate, N-methylpyrrolidone, tetrahydrofuran, and propylene carbonate.

7. The stabilizing formulation of claim 1, wherein the amine stabilizer is selected from 1,2-diaminocyclohexane (DCH), Bis(hexamethylene)triamine (BHT), monoethanolamine, ethylaminoethanol, dimethylaminoethanol, isopropylaminoethanol, diethanolamine, triethanolamine, methylaminoethanol, aminopropanol, methylaminopropanol, dimethylaminopropanol, aminobutanol, dimethylaminobutanol, aminobutanediol, trihydroxymethylaminoethane, diethylaminopropanediol, 1-amino-cyclopentane methanol, and aminobenzyl alcohol.

8. The stabilizing formulation of claim 1, wherein the nitrogen-stabilizing composition is present in an amount of from about 5% to about 50% w/w based on the total weight of the stabilizing formulation; the aprotic solvent is present in an amount of from about 50% to about 75% w/w based on the total weight of the stabilizing formulation; and the amine stabilizer is present in an amount of from about 3% to about 8% w/w based on the total weight of the stabilizing formulation.

9. The stabilizing formulation of claim 1, wherein the nitrogen-stabilizer component is present in an amount of from about 5% to about 50% w/w based on the total weight of the stabilizing formulation.

10. The stabilizing formulation of claim 1, wherein the nitrogen-stabilizer component comprises a urease inhibitor that is present in an amount of from about 5% to about 15% w/w based on the total weight of the stabilizing formulation and a nitrification inhibitor that is present in an amount of from about 5% to about 20% w/w based on the total weight of the stabilizing formulation.

11. The stabilizing formulation of claim 1, wherein the nitrogen-stabilizer component comprises a urease inhibitor that is present in an amount of from about 5% to about 15% w/w and a nitrification inhibitor that is present in an amount of from about 5% to about 20% w/w, and the vehicle comprises an aprotic solvent that is present in an amount of from about 50% to about 75% and an amine stabilizer that is present in an amount of from about 3% to about 8% w/w, wherein all weights are based on the total weight of the stabilizing formulation.

12. The stabilizing formulation of claim 10, wherein the urease inhibitor is DCD and the nitrification inhibitor is NBPT, the aprotic solvent is DMSO, the amine stabilizer is monoethanolamine.

13. An agricultural composition comprising the stabilizing formulation of claim 1 and a fertilizer.

14. The agricultural composition of claim 13, wherein the fertilizer is a urea-containing fertilizer.

15. The agricultural composition of claim 14, wherein the stabilizing formulation is applied to the surface of the fertilizer in the form of an aqueous dispersion.

16. A method of inhibiting soil-borne urease enzyme comprising the step of applying to the soil a stabilizing formulation of claim 1, said formulation being present in a quantity sufficient to inhibit the decomposition of urea by the action of soil-borne urease enzyme.

17. The composition of claim 1, wherein the amine stabilizer is present in an amount of from about 3% to about 8% w/w based on the total weight of the stabilizing formulation.

* * * * *